(12) United States Patent
Yang et al.

(10) Patent No.: US 12,485,873 B2
(45) Date of Patent: Dec. 2, 2025

(54) CONTROL METHOD AND VEHICLE CONTROLLER FOR HYBRID VEHICLE

(71) Applicant: BYD COMPANY LIMITED, Guangdong (CN)

(72) Inventors: Dongsheng Yang, Shenzhen (CN); Chunsheng Wang, Shenzhen (CN); Yunhui Bai, Shenzhen (CN); Mingwen Chen, Shenzhen (CN); Guoxiang Lu, Shenzhen (CN); Xuechao Wang, Shenzhen (CN); Jiquan Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 209 days.

(21) Appl. No.: 18/216,695

(22) Filed: Jun. 30, 2023

(65) Prior Publication Data

US 2023/0339451 A1 Oct. 26, 2023

Related U.S. Application Data

(63) Continuation of application No. PCT/CN2021/083380, filed on Mar. 26, 2021.

(30) Foreign Application Priority Data

Mar. 2, 2021 (CN) .......................... 202110228793.2

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *B60W 10/08* (2013.01); *B60W 20/12* (2016.01);
(Continued)

(58) Field of Classification Search
CPC ...... B60W 20/13; B60W 10/06; B60W 10/08; B60W 20/12; B60W 20/15; B60W 20/20;
(Continued)

(56) References Cited

U.S. PATENT DOCUMENTS

2020/0324754 A1 10/2020 Song

FOREIGN PATENT DOCUMENTS

| CN | 101992726 A | 3/2011 |
| CN | 103350696 A | 10/2013 |

(Continued)

OTHER PUBLICATIONS

International Search Report and Written Opinion for Application No. PCT/CN2021/083380, mailed on Dec. 2, 2021, 9 pages.

*Primary Examiner* — Brian P Sweeney
(74) *Attorney, Agent, or Firm* — Sheppard Mullin Richter & Hampton LLP

(57) ABSTRACT

A method for controlling a hybrid vehicle, includes: acquiring a traveling parameter of the hybrid vehicle; controlling the engine, the driving motor, and the electric generator according to the traveling parameter, to enable the engine to operate in an economic zone by controlling charging and discharging of the power battery; comparing equivalent fuel consumptions of a series mode, a parallel mode, and an EV mode of the hybrid vehicle, and determining a minimum equivalent fuel consumption among the equivalent fuel consumptions; and selecting one of the series mode, the parallel mode, or the EV mode having the minimum equivalent fuel consumption as a current operation mode of the hybrid vehicle. The hybrid vehicle includes the engine and a driving motor outputting power to a wheel end, an electric generator generating electricity, and the power battery supplying electricity to the driving motor and charged by the electric generator or the driving motor.

19 Claims, 7 Drawing Sheets

(51) Int. Cl.
*B60W 10/08* (2006.01)
*B60W 20/12* (2016.01)
*B60W 20/15* (2016.01)
*B60W 20/20* (2016.01)

(52) U.S. Cl.
CPC ............ *B60W 20/15* (2016.01); *B60W 20/20* (2013.01); *B60W 2510/244* (2013.01); *B60W 2520/30* (2013.01)

(58) Field of Classification Search
CPC ....... B60W 2510/244; B60W 2520/30; B60W 2520/10; B60W 10/02; B60W 30/1882; B60W 20/11; B60W 10/26; B60W 2710/0666; B60W 2710/08; B60W 2710/248; B60W 2710/244; B60W 2720/10; B60W 2720/30; B60K 6/442; B60L 2240/423; B60L 2240/443; B60L 50/62; B60L 58/12; B60L 2260/26; B60L 2270/12; B60L 15/2045; Y02T 10/62; Y02T 10/70; Y02T 10/92; B60Y 2200/92
See application file for complete search history.

(56) References Cited

FOREIGN PATENT DOCUMENTS

| | | | | |
|---|---|---|---|---|
| CN | 104442345 B | * | 3/2015 | ............... B60K 6/36 |
| CN | 103189226 B | | 12/2015 | |
| CN | 108656924 A | | 10/2018 | |
| CN | 108656929 A | | 10/2018 | |
| CN | 108973977 A | | 12/2018 | |
| CN | 109910868 A | | 6/2019 | |
| CN | 110239512 A | | 9/2019 | |
| CN | 110304042 A | | 10/2019 | |
| CN | 109606348 B | | 3/2020 | |
| CN | 110040004 B | | 10/2020 | |
| CN | 111824114 A | | 10/2020 | |
| CN | 111907511 A | | 11/2020 | |
| CN | 111942367 A | | 11/2020 | |
| CN | 112193232 A | | 1/2021 | |
| EP | 2815942 A1 | | 12/2014 | |
| EP | 2902287 A1 | | 8/2015 | |
| EP | 3309031 A1 | | 4/2018 | |
| EP | 3309032 A1 | | 4/2018 | |
| JP | H11229916 A | | 8/1999 | |
| JP | 2013513520 A | | 4/2013 | |
| JP | 2014-121962 A | | 7/2014 | |
| JP | 2015182550 A | | 10/2015 | |

* cited by examiner

CONTROL METHOD AND VEHICLE CONTROLLER FOR HYBRID VEHICLE

CROSS-REFERENCE TO RELATED APPLICATIONS

This application is a Continuation Application of International Patent Application No. PCT/CN2021/083380, filed on Mar. 26, 2021, which is based on and claims priority to and benefits of Chinese Patent Application No. 202110228793.2 filed on Mar. 2, 2021. The entire content of all of the above-referenced applications is incorporated herein by reference.

FIELD

The present disclosure relates to the technical field of vehicles, and particularly, to a control method and a vehicle controller for a hybrid vehicle.

BACKGROUND

With the development of hybrid electric vehicles, increasingly high requirement for the economy is raised by the users for hybrid electric vehicles. Due to the current hybrid system architecture and its policy, the optimum energy consumption of the vehicles cannot be achieved. Therefore, the user's requirement for the economy of hybrid electric vehicles cannot be satisfied and the user's expectation cannot be met.

For example, due to the system architecture of the traditional range extended hybrid electric vehicles, the driving can only be realized by generating electricity by the electric generator driven by the engine and then supplying it to the driving motor. Therefore, even in a medium- or high-speed high-efficiency operating condition directly driven by the engine, energy conversion by the generator is necessitated, causing a large loss. This leads to the failure to achieve an optimum energy consumption in the medium- and high-speed operating conditions, and thus the low economy of the vehicles.

SUMMARY

The present disclosure solves one of the technical problems in related art. A first aspect of the present disclosure is to provide a method for controlling a hybrid vehicle, which enables the hybrid vehicle to operate with a low energy consumption in an operation mode of a minimum equivalent fuel consumption according to the traveling parameters, thereby effectively improving the economy of the hybrid vehicle, and meeting the user's expectation during use.

A second aspect of the present disclosure is to provide a non-transitory computer-readable storage medium.

A third aspect of the present disclosure is to provide a vehicle controller.

An embodiment according to the first aspect of the present disclosure provides a method for controlling a hybrid vehicle. The hybrid vehicle includes an engine, a driving motor, an electric generator, and a power battery. The engine is configured to output power to a wheel end. The driving motor is configured to output power to the wheel end. The electric generator is connected to the engine and driven by the engine to generate electricity. The power battery is configured to supply electricity to the driving motor and be charged with an alternating current outputted by the electric generator or the driving motor, where the capacity of the power battery is greater than or equal to a first capacity. The control method includes the following steps: acquiring a traveling parameter of the hybrid vehicle; controlling the engine, the driving motor, and the electric generator according to the traveling parameter, to enable the engine to operate in an economic zone by controlling charging and discharging of the power battery; comparing equivalent fuel consumptions of a series mode, a parallel mode, and an EV mode, of the hybrid vehicle, and determining a minimum equivalent fuel consumption among the equivalent fuel consumptions; and selecting one of the series mode, the parallel mode, or the EV mode having the minimum equivalent fuel consumption as a current operation mode of the hybrid vehicle.

In the method for controlling a hybrid vehicle according to the embodiment of the present disclosure, a traveling parameter of the hybrid vehicle is acquired; the engine, the driving motor, and the electric generator are controlled according to the traveling parameter, to enable the engine to always operate in an economic zone when it is in an operating state, by controlling charging and discharging of the power battery; and the equivalent fuel consumptions when the hybrid vehicle is in the series mode, the parallel mode, and the EV mode are compared to determine a minimum equivalent fuel consumption, to select an operation mode having the minimum equivalent fuel consumption as a current operation mode of the hybrid vehicle. In this way, the hybrid vehicle is allowed to operate with a low energy consumption in an operation mode having the minimum equivalent fuel consumption according to the traveling parameter, thereby effectively improving the economy of the hybrid vehicle, and meeting the user's expectation during use.

An embodiment according to the second aspect of the present disclosure provides a non-transitory computer-readable storage medium storing a control program for the hybrid vehicle, when executed by a processor, implementing the method for controlling a hybrid vehicle as described above.

The non-transitory computer-readable storage medium according to the embodiment of the present disclosure enables, by the method for controlling a hybrid vehicle as described above, the hybrid vehicle to operate with a low energy consumption in an operation mode having the minimum equivalent fuel consumption according to the traveling parameter, thereby effectively improving the economy of the hybrid vehicle, and meeting the user's expectation during use.

An embodiment according to the third aspect of the present disclosure provides a vehicle controller, which includes: a memory, a processor, and a control program for a hybrid vehicle stored in the memory and executable on the processor. When the control program for a hybrid vehicle is executed by the processor, the method for controlling a hybrid vehicle as described above is implemented.

The vehicle controller according to the embodiment of the present disclosure enables, by the method for controlling a hybrid vehicle as described above, the hybrid vehicle to operate with a low energy consumption in an operation mode having the minimum equivalent fuel consumption according to the traveling parameter, thereby effectively improving the economy of the hybrid vehicle, and meeting the user's expectation during use.

The additional aspects and advantages of the present disclosure will be provided in the following description,

Figure 1A:
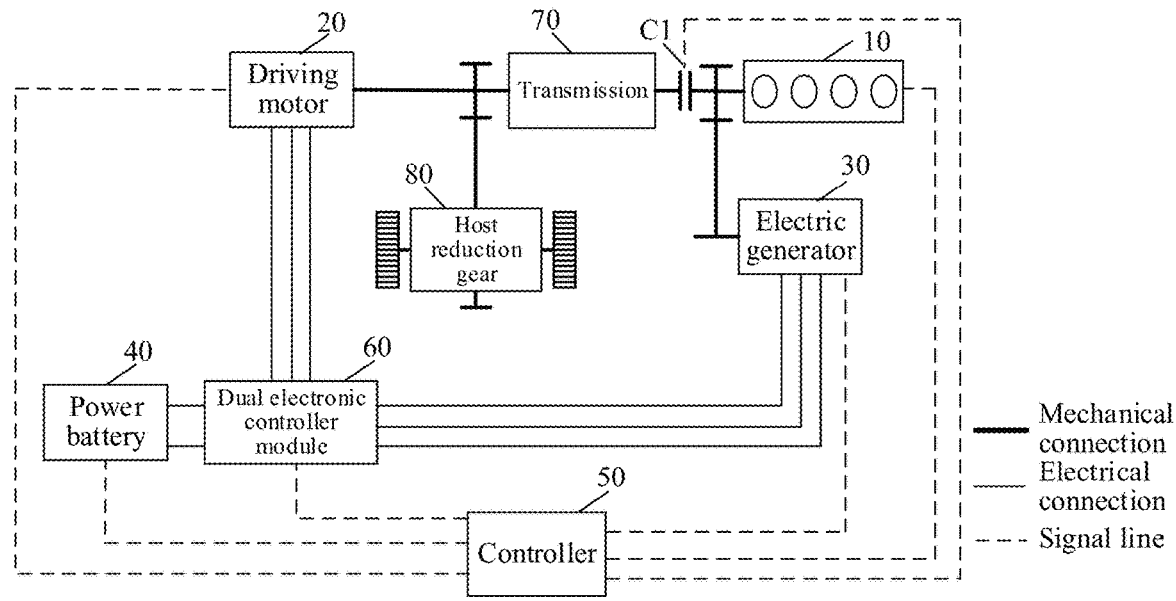
FIG. 1a is a schematic structural view of a hybrid system according to a first embodiment of the present disclosure.

LIST OF REFERENCE NUMERALS 1000 hybrid vehicle, 100 hybrid system, 10 engine, 20 driving motor, 30 electric generator, 40 power battery, 50 controller, 60 dual electronic controller module, 61 first inverter, 62 second inverter, 63 DC/DC, 70 transmission, 80 host reduction gear, C1 clutch, 2000 vehicle controller, 2100 memory, and 2200 processor.

DETAILED DESCRIPTION

The embodiments of the present disclosure will be described below in detail. Examples of the embodiments are shown in the accompanying drawings, and the same or similar reference numerals in all the accompanying drawings indicate the same or similar components or components having the same or similar functions. The embodiments described below with reference to the accompanying drawings are to explain the present disclosure, and cannot be construed as a limitation on the present disclosure.

A hybrid system 100, a hybrid vehicle 1000 and a control method therefor, a vehicle controller 2000 and a computer-readable storage medium according to the embodiments of the present disclosure will be described below with reference to accompanying drawings.

FIG. 1a is a schematic structural view of a hybrid system 100 for according to an embodiment of the present disclosure. As shown in FIG. 1a, the hybrid system 100 includes: an engine 10, a driving motor 20, an electric generator 30, a power battery 40, and a controller 50.

The engine 10 is configured to selectively output power to a wheel end. The driving motor 20 is configured to output power to the wheel end. The electric generator 30 is connected to the engine 10, and driven by the engine 10 to generate electricity. The power battery 40 is configured to supply electricity to the driving motor 20, and be charged with an alternating current outputted by the electric generator 30 or the driving motor 20, where the capacity of the power battery 40 is greater than or equal to a first preset capacity. The controller 50 is configured to acquire a traveling parameter of a hybrid vehicle 1000; control the engine 10, the driving motor 20, and the electric generator 30 according to the traveling parameter, to enable the engine 10 to operate in an economic zone by controlling charging and discharging of the power battery 40; and compare equivalent fuel consumptions when the hybrid vehicle 1000 is in a series mode, a parallel mode, and an EV modes, to select an operation mode from one of the series mode, the parallel mode, or the EV mode with a minimum equivalent fuel consumption as a current operation mode of the hybrid vehicle 1000.

In an embodiment, the engine 10 can be an Atkinson cycle engine 10, and a clutch C1 is provided/disposed between the engine 10 and the wheel end. The controller 50 controls the connection and disconnection of the engine 10 with and from the wheel end by controlling the disengagement and engagement of the clutch C1, so that the engine 10 can selectively output power to the wheel end. In this way, direct driving by the engine 10 is realized, that is, the engine 10 directly outputs the power to the wheel end. For example, when the controller 50 controls the clutch C1 to disengage, the engine 10 is disconnected from the wheel end, and the engine 10 will directly output power to the wheel end. When the controller 50 controls the clutch C1 to engage, the engine 10 is connected to the wheel end, and the engine 10 directly outputs power to the wheel end, to realize the direct driving by the engine 10. Compared with the traditional range extended hybrid electric vehicles, this architecture has a direct driving path by the engine 10, to avoid the loss caused by energy conversion in the traditional range extended hybrid electric vehicles due to the lack of a direct driving path by the engine, thus effectively improving the economy of the vehicle. Even though the engine in the traditional range extended hybrid electric vehicles is highly efficient (the rotational speed and torque of the engine are both efficient), the driving can only be realized by generating electricity by the electric generator and then providing it to the driving motor, and further loss is caused by energy conversion due to the frequent working of the power battery in charging/discharging states.

The driving motor 20 can be a hair-pin motor, in which rectangular coils are used for the stator winding, to improve the slot fullness of the stator slot, reduce the motor volume, and greatly improve the power density of the motor. The driving motor 20 is directly connected with the wheel end through a gear, and the controller 50 outputs power to the wheel end by controlling the driving motor 20 to operate. According to some embodiments of the present disclosure, the driving motor 20 is arranged/disposed in parallel to the electric generator 30. Compared with other arrangements/ configuration where for example, the driving motor 20 and the electric generator 30 are arranged/disposed coaxially, the parallel arrangement/configuration in this embodiment has a low design requirement for the motor, so that the large-power electric generator 30 can be easily configured, and the cost is low.

The electric generator 30 can be a hair-pin motor, the electric generator 30 is connected between the clutch C1 and the engine 10, and the electric generator 30 is directly connected with the engine 10 through a gear. The controller 50 controls the engine 10 to operate, which in turn drives the electric generator 30 to generate electricity. The generated electricity can be controlled by the controller 50 to charge the power battery 40 or power the driving motor 20.

Figure 1B:
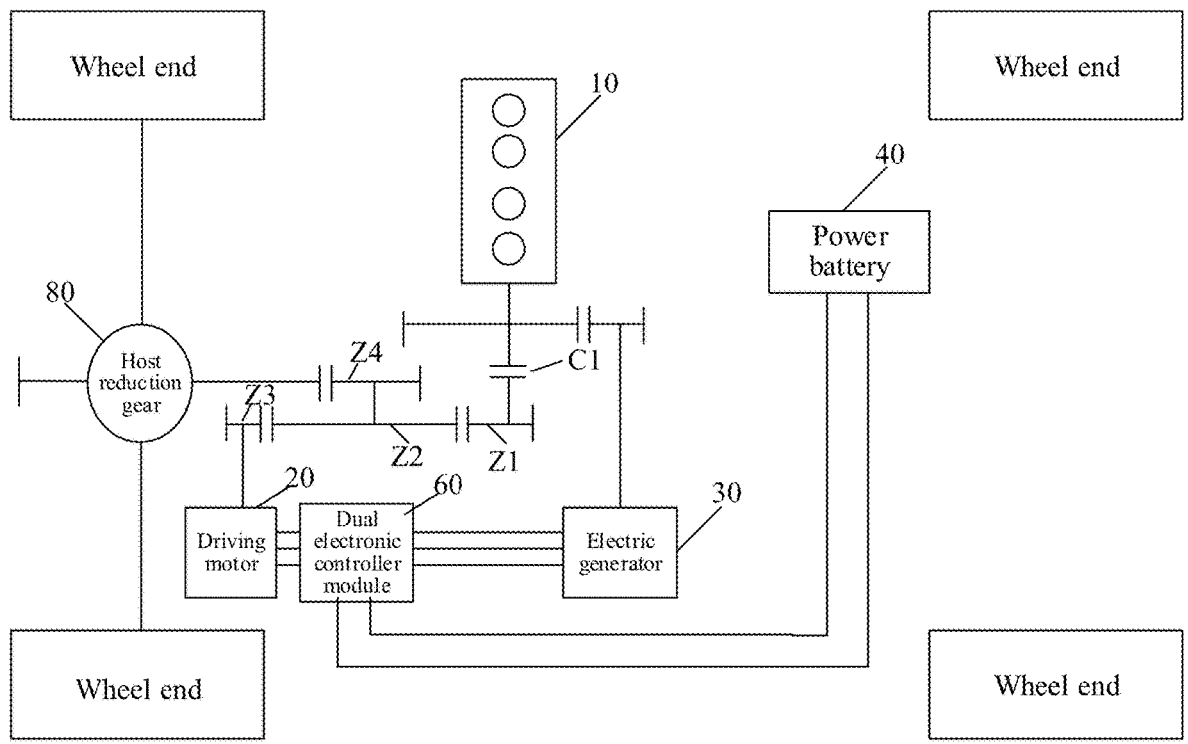
FIG. 1b is a schematic structural view of a hybrid system according to a second embodiment of the present disclosure.

In some embodiments of the present disclosure, as shown in FIG. 1a, the hybrid system 100 further includes a transmission 70 and a host reduction gear 80. As shown in FIG. 1b, the transmission 70 further includes gears Z1, Z2, Z3, and Z4. A central shaft of the gear Z1 is connected to one end of the clutch C1, the gear Z1 is engaged with the gear Z2, the gear Z2 is engaged with the gear Z3, and a central shaft of the gear Z3 is connected to the driving motor 20. A central shaft of the gear Z2 is connected to a central shaft of the gear Z4, and the gear Z4 is engaged with a host reduction gear of the host reduction gear 80. In some embodiments, the transmission 70 can also have other structures, which is not limited herein.

The power battery 40 can be a blade battery. The power battery 40 is respectively electrically connected to the driving motor 20 and the electric generator 30, and the power battery 40 is controlled by the controller 50 to power the driving motor 20, or be charged with an alternating current outputted by the electric generator 30 or the driving motor 20. That is, the power battery 40 can be charged by the electric generator 30 or the driving motor 20. Moreover, the capacity of the power battery 40 is larger than or equal to a first preset capacity. For example, the first preset capacity is 5 kWh to 25 kWh. Due to the large capacity of the power battery 40, the power battery 40 has a good buffering effect by using the charging and discharging of the power battery 40, whereby the operation efficiency of the engine 10 can be adjusted, and the engine 10 can always operate in an economic zone when it is in an operating state. Otherwise, the operating efficiency of the engine 10 is low, and it will be in a non-operating state. The engine 10 operating in an economic zone means that the engine 10 always operates in the high-efficiency state. In this embodiment, the engine 10 operates in a state with a fuel efficiency of 38% or higher. The large capacity of the power battery 40 enables the hybrid system 100 to run in the EV mode for a long time, and the operating time of the engine 10 becomes shorter, thus reducing the fuel consumption.

The controller 50 is respectively connected to the engine 10, the driving motor 20, the electric generator 30, the power battery 40 and the clutch C1. The controller 50 can send a control signal to the engine 10, the driving motor 20, the electric generator 30, the power battery 40, and the clutch C1 so as to control them. The controller 50 acquires a traveling parameter of the hybrid vehicle 1000. According to some embodiments of the present disclosure, the traveling parameter includes at least one of a required wheel torque, SOC of the power battery 40, and travel speed of the hybrid vehicle 1000. The required wheel torque is also the required vehicle torque. The controller 50 controls the engine 10, the driving motor 20 and the electric generator 30 according to the traveling parameter, to enable the engine 10 to operate in an economic zone by charging and discharging control of the power battery 40; and compares equivalent fuel consumptions when the hybrid vehicle 1000 is in the series mode, the parallel mode, and the EV mode, to select an operation mode of minimum equivalent fuel consumption as a current operation mode of the hybrid vehicle 1000. It should be noted that the equivalent fuel consumptions are compared based on a situation where the engine 10 operates in the economic zone, for example, the engine 10 operates in an economic zone of 25 kW. However, combining the traveling parameter such as the required wheel torque, the fuel consumption in the parallel mode may be lower than the fuel consumption in the series mode, and also lower than the fuel consumption in the EV mode. In this case, the hybrid vehicle 1000 is controlled to run in the parallel mode. If the fuel consumption in the EV mode is lower than the fuel consumption in the parallel mode and also lower than the fuel consumption in the series mode, the hybrid vehicle 1000 is controlled to run in the EV mode. In addition, it is to be noted that the equivalent fuel consumption is a sum of the fuel consumed by the engine 10 itself and the fuel equivalent to the electricity consumed by the power battery 40. The electricity consumed by the power battery 40 can be empirically converted into fuel to obtain the fuel equivalent to the electricity consumed by the power battery 40. When the power battery 40 is charged, the fuel equivalent to the electricity consumed by the power battery 40 is a negative value. When the power battery 40 is discharged, the fuel equivalent to the electricity consumed by the power battery 40 is a positive value.

That is to say, considering the traveling parameter such as required wheel torque of the hybrid vehicle 1000, SOC of the power battery 40, speed of the hybrid vehicle 1000, and equivalent fuel consumption of the hybrid vehicle 1000 in various operating modes in combination, the controller 50 enables the hybrid vehicle 1000 to operate in an operating mode with minimum equivalent fuel consumption while the power demand and Noise, Vibration, Harshness (NVH) are met. In this way, the equivalent fuel consumption of the hybrid vehicle 1000 is minimum under all operating conditions, and the hybrid vehicle 1000 has high economy. The series mode means that the power output between the engine 10 and the wheel end is cut off (that is, the clutch C1 is in a disengaged state), and the engine 10 drives the electric generator 30 to generate electricity and provide it to the driving motor 20. In some cases, the engine 10 also charges excess energy to the power battery 40 by the electric generator 30. The parallel mode means the power coupling between the engine 10 and the wheel end (that is, the clutch C1 is in an engaged state). In some cases, the engine 10 also charges excess energy to the power battery 40 by the driving motor 20. The EV mode means that neither engine 10 nor electric generator 30 operates, and the power battery 40 supplies power to the driving motor 20. When the hybrid vehicle 1000 operates in the series mode, the parallel mode, or the EV mode, the engine 10 is controlled, by the charging and discharging control of the power battery 40, to always operate in an economic zone during operation, and the equivalent fuel consumptions are compared based on a situation where the engine 10 is in an economic zone. In this way, the engine 10 is enabled to always operate in the economic zone under all operating conditions, and the equivalent fuel consumption of the hybrid vehicle 1000 is minimum, thereby effectively improving the economy of the hybrid vehicle 1000. In this embodiment, by using the combined control and cooperation of the large-capacity power battery 40, the engine 10, the driving motor 20 and the electric generator 30, the hybrid vehicle 1000 is ensured to operate in an energy-saving mode.

In some embodiments of the present disclosure, when the hybrid vehicle 1000 is in the series mode, the engine 10 charges the power battery 40 by the electric generator 30. When the hybrid vehicle 1000 is in the parallel mode, the engine 10 charges the power battery 40 by the driving motor 20. In this embodiment, the engine 10 charges the power battery 40 by different motors in the series mode and parallel mode, to minimize the loss and reduce the energy consumption of the vehicle.

In some embodiments of the present disclosure, when the engine 10 operates in the economic zone, the controller 50 is further configured to control the engine 10 to operate on an optimum economic line, when SOC of the power battery 40 is greater than or equal to a first preset value; or control the engine 10 to operate on the optimum economic line when SOC of the power battery 40 is less than the first preset value and the output power of the engine 10 is greater than or equal to a required wheel power. The first preset value inversely correlates with the first preset capacity.

In an embodiment, when the engine 10 operates in the economic zone, if SOC of the power battery 40 is greater than or equal to the first preset value, or SOC of the power battery 40 is less than the first preset value and the output power of the engine 10 is greater than or equal to the required wheel power, the controller 50 controls the engine 10 to operate on the optimum economic line.

That is to say, when the power battery 40 can supply a certain power, or the power of the power battery 40 is low, and the required wheel power is small at this time, the hybrid vehicle 1000 can be enabled to operate on the optimum economic line. It should be noted that the engine 10 has at least one economic line in the economic zone, and one of these economic lines is an optimum economic line. The fuel consumption of the engine 10 corresponding to the optimum economic line is minimum. The fuel consumption of the hybrid vehicle 1000 may reach a minimum value by controlling the engine 10 to operate on the optimum economic line. In addition, it is to be noted that the first preset value inversely correlates with the first preset capacity. In practical use, the first preset value can be obtained by a look-up table method according to the first preset capacity, and the first preset value may be different in different modes. For example, the first preset value may be 17% in the series mode, and the first preset value may be 25% in the parallel mode. In this embodiment, the capacity of the power battery 40 is greater than or equal to the first preset capacity. The power battery 40 is a large-capacity battery, and the first preset value can be set to be extremely low. Even if SOC of the power battery 40 is low, the engine 10 also can operate on the optimum economic line. The setting of the capacity of the power battery 40 to be greater than or equal to the first preset capacity allows the engine 10 of the hybrid vehicle 1000 to operate on the optimum economic line for a longer time.

In some embodiments of the present disclosure, when the hybrid vehicle 1000 is in the parallel mode, the controller 50 is further configured to determine a required wheel torque. When the required wheel torque is less than the output torque when the engine 10 operates on the economic line, the engine 10 is controlled to operate on the economic line to respond to the required wheel torque, and the engine 10 is controlled to drive the driving motor 20 to generate electricity, so as to charge excess energy outputted by the engine 10 to the power battery 40 by the driving motor 20. When the required wheel torque is greater than the output torque when the engine 10 operates on the economic line, the engine 10 is controlled to operate on the economic line, and the power battery 40 is controlled to power the driving motor 20, so both the power battery 40 and the engine 10 respond to the required wheel torque.

It should be noted that the process occurs in the parallel mode of the hybrid vehicle 1000. In the parallel mode, the large-capacity power battery 40 can be used to supplement the torque or take in excess torque, that is, the power battery 40 plays a buffering role, so that the engine 10 can operate in the high-efficiency economic zone for a longer time, and the equivalent fuel consumption of the hybrid vehicle 1000 in the parallel mode is minimum, thus making the hybrid vehicle 1000 more economical.

In an embodiment, the controller 50 can control the clutch C1 to engage, to cause power coupling between the engine 10 and the wheel end; and control the engine 10 to operate, to allow the hybrid vehicle 1000 to enter a parallel mode. In the parallel mode, the controller 50 acquires the required wheel torque, and compares it with the output torque when the engine 10 operates on the economic line.

If the required wheel torque is less than or equal to the output torque when the engine 10 operates on the economic line, the engine 10 is controlled to remain to operate on the economic line, to meet the power demand. Meanwhile, the controller 50 controls the engine 10 to drive the driving motor 20 generate electricity and the electric generator 30 to be idle, so that excess energy outputted by the engine 10 is charged to the power battery 40 by the driving motor 20. At this time, the hybrid vehicle 1000 enters a parallel electricity generation mode in the parallel mode. That is, the parallel mode includes the parallel electricity generation mode. The parallel electricity generation is to generate electricity by the driving motor 20. The power of the driving motor 20 is larger, so the power supplementing rate is higher; and the loss when the electric generator 30 is idle is less than the loss when the driving motor 20 is idle, so the energy saving effect is better. Therefore, the driving motor 20 is used for electricity generation in the mode, thereby further improving the economy of the vehicle. Moreover, excess energy outputted by the engine 10 is charged to the power battery 40, so the power in the power battery 40 increase accordingly, and the vehicle can operate in the EV mode for a longer time, with a better economy.

If the required wheel torque is greater than the output torque when the engine 10 operates on the economic line, the engine 10 is controlled to remain to operate on the economic line, and the power battery 40 is controlled to power the driving motor 20. At this time, both the power battery 40 and the engine 10 provide the required wheel torque, to meet the power demand; and the hybrid vehicle 1000 enters a parallel assisting mode in the parallel mode.

Therefore, when the hybrid vehicle 1000 is in the parallel mode, the power battery 40 plays a buffering role, such that the operating area of the engine 10 is in an economic zone (that is, on the economic line) on the efficiency curve diagram, and the engine 10 is ensured to always operate in the economic zone. As a result, the hybrid vehicle 1000 has high economy. In this embodiment, the capacity of the power battery 40 is greater than or equal to the first preset capacity. The large-capacity power battery 40 can play a buffering role to supplement the torque or take in excess torque when the engine 10 operates.

In some other embodiments of the present disclosure, when the hybrid vehicle 1000 is in the series mode, the controller 50 is further configured to determine a required wheel power according to the required wheel torque and speed of the vehicle; control the engine 10 to operate on an economic line, so as to drive the electric generator 30 to generate electricity according to a output torque when the engine 10 operates on the economic line and output power to the wheel end by the driving motor 20; charge excess power to the power battery 40 by the electric generator 30 when the electricity generation power of the electric generator 30 is greater than the required wheel power; and control the power battery 40 to power the driving motor 20, so both the engine 10 and the power battery 40 respond to the required wheel power, when the electricity generation power of the electric generator 30 is less than the required wheel power.

It should be noted that the process occurs in the series mode of the hybrid vehicle 1000. In the series mode, the large-capacity power battery 40 can be used to supplement the power or take in excess power, that is, the power battery 40 plays a buffering role, so that the engine 10 can operate in the high-efficiency economic zone for a longer time, thus making the hybrid vehicle 1000 more economical.

In an embodiment, the controller 50 can control the clutch C1 to disengage, to cut off the power output between the engine 10 and the wheel end; and the engine 10 drives the electric generator 30 to generate electricity and the power is outputted by the driving motor 20 to the wheel end, to allow the hybrid vehicle 1000 to enter the series mode. In the series mode, the controller 50 controls the engine 10 to operate on the economic line, acquires a required wheel torque and speed of the hybrid vehicle 1000, acquires a required wheel power according to the required wheel torque and speed of the hybrid vehicle 1000, and compares the required wheel power with the electricity generation power of the electric generator 30. The electricity generation power of the electric generator 30 is a power outputted when the electric generator 30 is driven to generate electricity by the torque outputted by the engine 10 operating on the economic line. Excess power is charged to the power battery 40 by the electric generator 30 if the electricity generation power of the electric generator 30 is greater than the required wheel power. The power battery 40 is controlled to power the driving motor 20, so both the engine 10 and the power battery 40 provides the required wheel power, if the electricity generation power of the electric generator 30 is less than or equal to the required wheel power.

It should be noted that power is compared in the series mode, so as to avoid the control deviation caused by the incompletely efficiently following by the electricity generation and driving power when torque comparison is adopted.

Therefore, when the hybrid vehicle 1000 is in the series mode, the power battery 40 plays a buffering role, such that the operating area of the engine 10 is in an economic zone (that is, on the economic line) on the efficiency curve diagram, and the engine 10 is ensured to always operate in the economic zone. As a result, the hybrid vehicle 1000 has high economy. In this embodiment, the capacity of the power battery 40 is greater than the first preset capacity. The large-capacity power battery 40 can play a buffering role to supplement the power or take in the excess power when the engine 10 operates.

In some embodiments of the present disclosure, the controller 50 is further configured to determine, when the speed of the hybrid vehicle 1000 is greater than or equal to a preset vehicle speed threshold, a first wheel torque threshold entering the parallel mode and a second wheel torque threshold exiting the parallel mode of the hybrid vehicle 1000 according to SOC of the power battery 40 and the speed of the hybrid vehicle 1000, and control the hybrid vehicle 1000 to enter the parallel mode when the required wheel torque is greater than or equal to the first wheel torque threshold and less than or equal to the second wheel torque threshold; control the engine 10 to operate on the economic line, and control the power battery 40 to power the driving motor 20, so both the engine 10 and the power battery 40 respond to the required wheel torque, when the required wheel torque is greater than the output torque when the engine 10 operates on the economic line; control the engine 10 to operate on the economic line to respond to the required wheel torque, and control the engine 10 to drive the driving motor 20 to generate electricity, so as to charge the excess energy outputted by the engine 10 to the power battery 40 by the driving motor 20, if the required wheel torque is less than the output torque when the engine 10 operates on the economic line; and control the engine 10 to operate on the economic line, to respond to the required wheel torque independently, if the required wheel torque is equal to the output torque when the engine 10 operates on the economic line, where the first wheel torque threshold is less than the second wheel torque threshold.

That is, the operating mode of the hybrid vehicle 1000 can be determined according to the required wheel torque of the hybrid vehicle 1000, SOC of the power battery 40, and speed of the hybrid vehicle 1000, to ensure that the hybrid vehicle 1000 operates in a mode with the minimum equivalent fuel consumption, and achieve the energy saving.

In an embodiment, during the traveling of the hybrid vehicle 1000, the controller 50 acquires the speed of the hybrid vehicle 1000 and compares it with a preset vehicle speed threshold (e.g., 65 Km/h). When the speed of the hybrid vehicle 1000 is greater than or equal to the preset vehicle speed threshold, the controller 50 can determine a first wheel torque threshold T1 entering the parallel mode and a second wheel torque threshold T2 exiting the parallel mode of the hybrid vehicle 1000 by a look-up table method according to SOC of the power battery 40 and speed of the hybrid vehicle 1000. Then, the controller 50 acquires a required wheel torque of the hybrid vehicle 1000, and compares it with the first wheel torque threshold T1 and the second wheel torque threshold T2. When the required wheel torque is greater than or equal to the first wheel torque threshold T1 and less than or equal to the second wheel torque threshold T2, the controller 50 controls the clutch C1 to engage, to cause power coupling between the engine 10 and the wheel end, so as to allow the hybrid vehicle 1000 to enter the parallel mode.

After the hybrid vehicle 1000 enters the parallel mode, if the required wheel torque is greater than the output torque when the engine 10 operates on the economic line, the controller 50 control the engine 10 to operate on the economic line, and control the power battery 40 to power the driving motor 20. Both the engine 10 and the power battery 40 provide the required wheel torque. At this time, the hybrid vehicle 1000 enters the parallel assisting mode in the parallel mode. If the required wheel torque is less than the output torque when the engine 10 operates on the economic line, the controller 50 controls the engine 10 to remain to operate on the economic line, so as to provide the required wheel torque; and control the engine 10 to drive the driving motor 20 to generate electricity, so as to charge excess energy outputted by the engine 10 to the power battery 40 by the driving motor 20. At this time, the hybrid vehicle 1000 enters the parallel electricity generation mode in the parallel mode. If the required wheel torque is equal to the output torque when the engine 10 operates on the economic line, the controller 50 controls the engine 10 to remain to operate on the economic line, so as to provide the required wheel torque independently. At this time, the hybrid vehicle 1000 enters the parallel direct-driving mode in the parallel mode.

Therefore, the hybrid vehicle 1000 is controlled to enter the parallel mode according to the required wheel torque of the hybrid vehicle 1000, SOC of the power battery 40, and speed of the hybrid vehicle 1000, and different modes in the parallel mode are used, such that the engine 10 always operates in the economic zone, thereby achieving the object of energy saving, and ensuring the high economy of the hybrid vehicle 1000. Moreover, the hybrid vehicle 1000 can operate in the parallel direct-driving mode. In contrast, in the traditional range extended hybrid electric vehicles, due to the lack of a direct driving path by the engine, even in a medium- or high-speed high-efficiency operating condition directly driven by the engine, the driving can only be realized by generating electricity and then providing it to the driving motor, which necessitates the energy conversion by the electric generator, causing loss due to energy conversion. In the traditional range extended hybrid electric vehicles, the power battery frequently works in charging/discharging states, further causing loss due to energy conversion. In the present disclosure, the hybrid vehicle 1000 can operates in the parallel direct-driving mode, to effectively avoid the loss above, thereby improving the economy of the hybrid vehicle 1000. It can be understood that in this embodiment, at the current required wheel torque, the current SOC and the current vehicle speed, more energy can be saved when the hybrid vehicle 1000 operates in the parallel mode than in the series mode and the EV mode.

According to some embodiments of the present disclosure, the first wheel torque threshold T1 and the second wheel torque threshold T2 positively correlate with SOC of the power battery 40. That is to say, the first wheel torque threshold T1 and the second wheel torque threshold T2 vary with the SOC of the power battery 40, so as to achieve power reservation of the power battery 40 while energy saving is ensured. Moreover, when SOC of the power battery 40 is low, the engine 10 is caused to operate as much as possible; and when SOC of the power battery 40 is high, the vehicle is caused to operate in the EV mode as much as possible, so as to allow the vehicle to have a good NVH performance while energy saving is ensured. In the practical use, the first wheel torque threshold T1 and the second wheel torque threshold T2 can be acquired by a look-up table method according to the SOC of the power battery 40, as shown in Table 1:

TABLE 1

| SOC of power battery 40 | First wheel torque threshold | Second wheel torque threshold |
|---|---|---|
| SOC < SOC1 | T11 | T21 |
| SOC1 ≤ SOC ≤ SOC2 | T12 | T22 |
| SOC2 < SOC | T13 | T23 |

SOC1 and SOC2 are preset values, and SOC1<SOC2; T11<T12<T13, and T21<T22<T23.

According to some embodiments of the present disclosure, when the hybrid vehicle 1000 operates in the parallel mode, the vehicle speed where the engine 10 participates in the operation inversely correlates with SOC of the power battery 40. That is to say, in the parallel mode, the vehicle speed where the engine 10 participates in the operation varies with the SOC of the power battery 40, so as to reduce the duration of the parallel mode as much as possible, and allow the power battery 40 to discharge to power the driving motor 20 as much as possible. That is, electricity is used as much as possible, and the vehicle operates in the EV mode as much as possible. In practical use, the vehicle speed V where the engine 10 participates in the operation can be acquired by a look-up table method according to the SOC of the power battery 40, as shown in Table 2:

TABLE 2

| SOC of power battery 40 | Vehicle speed V where the engine 10 participates in the operation |
|---|---|
| SOC < SOC1 | V1 |
| SOC1 ≤ SOC ≤ SOC2 | V2 |
| SOC2 < SOC | V3 |

SOC1 and SOC2 are preset values, and SOC1<SOC2 and V3<V2<V1.

In some embodiments of the present disclosure, the controller 50 is further configured to, when the required wheel torque is less than the first wheel torque threshold T1, control the engine 10 to stop operation and control the power battery 40 to power the driving motor 20, so as to respond to the required wheel torque by the power battery 40.

It should be noted that this process occurs in the EV mode, that is, a solely electric mode, of the hybrid vehicle 1000. When the hybrid vehicle 1000 operates in the EV mode, the engine 10 is not required to be involved in the operation. At this time, the fuel consumption rate is zero, and the efficiency of the hybrid vehicle 1000 can be up to 90% or more, so the vehicle has high economy. In an embodiment, when the required wheel torque is less than the first wheel torque threshold T1, the controller 50 controls the clutch C1 to disengage, to cut off the power output between the engine 10 and the wheel end, controls the engine 10 and the electric generator 30 to stop operation, and controls the power battery 40 to power the driving motor 20, where the required wheel torque is provided by the driving motor 20. At this time, the hybrid vehicle 1000 enters the EV mode, that is, the solely electric mode. It is to be understood that in this embodiment, at the current required wheel torque, current SOC and current vehicle speed, more energy is saved when the hybrid vehicle 1000 operates in the EV mode. Therefore, the operating mode of the vehicle is switched from the parallel mode to the EV mode.

Therefore, the hybrid vehicle 1000 is controlled to enter the EV mode according to the required wheel torque of the hybrid vehicle 1000, SOC of the power battery 40, and speed of the hybrid vehicle 1000. Due to the high efficiency in the EV mode, the purpose of energy saving is achieved, and the hybrid vehicle 1000 is ensured to have high economy.

In some embodiments of the present disclosure, the controller 50 is further configured to, when the required wheel torque is greater than the second wheel torque threshold T2, control the hybrid vehicle 1000 to enter the series mode; determine a required wheel power according to the required wheel torque and the vehicle speed; control the engine 10 to operate at a preset power at an optimum economic point, so as to drive the electric generator 30 to generate electricity according to the preset power when the engine 10 operates at the optimum economic point and output power to the wheel end by the driving motor 20; charge excess power to the power battery 40 by the electric generator 30 when the electricity generation power of the electric generator 30 is greater than the required wheel power; and control the engine 10 to increase the output power, and control the engine 10 to operate on the economic line of the engine 10, so as to respond to the required wheel power, when the electricity generation power of the electric generator 30 is less than the required wheel power.

In an embodiment, when the required wheel torque is greater than the second wheel torque threshold T2, the controller 50 controls the clutch C1 to disengage, to cut off the power output between the engine 10 and the wheel end; and the engine 10 drives the electric generator 30 to generate electricity and the power is outputted by the driving motor 20 to the wheel end, to allow the hybrid vehicle 1000 to enter the series mode. In the series mode, the controller 50 controls the engine 10 to operate at a preset power (for example, 25 kW) at the optimum economic point, acquires the required wheel torque and the vehicle speed, determine the required wheel power according to the required wheel torque and the vehicle speed, and compare it with the electricity generation power of the electric generator 30. The controller 50 controls the electric generator 30 to charge excess power to the power battery 40 if the electricity generation power of the electric generator 30 is greater than the required wheel power. The controller 50 controls the engine 10 to increase the output power and control the engine 10 to operate on the economic line of the engine 10 if the electricity generation power of the electric generator 30 is less than the required wheel power.

Therefore, the hybrid vehicle 1000 is controlled to enter the series mode according to the required wheel torque of the hybrid vehicle 1000, SOC of the power battery 40, and speed of the hybrid vehicle 1000, and different modes in the series mode are used, such that the engine 10 always operates in the economic zone, thereby achieving the object of energy saving, and ensuring the high economy of the hybrid vehicle 1000. It is to be understood that in this embodiment, at the current required wheel torque, current SOC and current vehicle speed, more energy is saved when the hybrid vehicle 1000 operates in the series mode. Therefore, the operating mode of the vehicle is switched from the parallel mode to the series mode, and the engines 10 always operates on the economic line, and particularly, is switched from the economic line in the parallel mode to the economic line in the series mode.

According to some embodiments of the present disclosure, the controller 50 is further configured to, when the electricity generation power of the electric generator 30 is less than the required wheel power, determine whether the current SOC of the power battery 40 is less than a second preset value (for example, 10%, and 15%, etc.), control the engine 10 to further increase the output power if the current SOC of the power battery 40 is less than a second preset value, so as to control the output power of the engine 10 to respond to the required wheel power, and charge the power battery 40 by the electric generator 30.

That is to say, when the electricity generation power of the electric generator 30 is less than the required wheel power and current SOC of the power battery 40 is less than the second preset value, namely, SOC of the power battery 40 is extremely low, the engine 10 will increase the output power while the driving demand is met. That is, the operating point of the engine 10 on the economic line moves toward a direction with increasing output torque. Some energy is transferred to the power battery 40, to charge the power battery 40. As a result, the power in the power battery 40 is supplemented while the engine 10 is driven in an energy saving mode.

Figure 2:
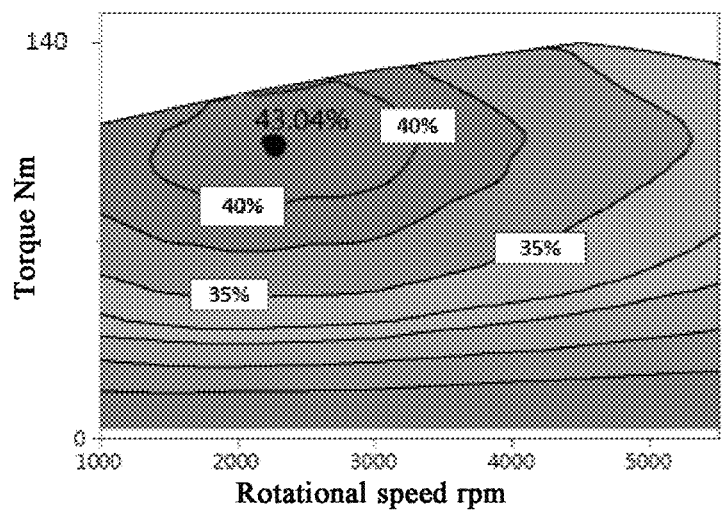
FIG. 2 is a schematic diagram showing an optimum economic point of an engine according to an embodiment of the present disclosure.

It should be noted that the heat efficiency is the highest when the engine 10 operates at the optimum economic point. As shown in FIG. 2, when the output power of the engine 10 is 25 kW, the corresponding heat efficiency is 43.04%.

Figure 3:
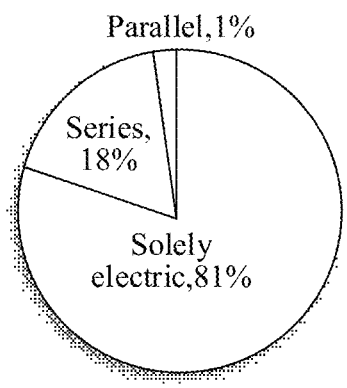
FIG. 3 shows the percentages of various driving modes under an electricity-deficient operating condition according to an embodiment of the present disclosure.

Therefore, after the engine 10 is activated, when the required wheel power is less than the electricity generation power of the electric generator 30, the engine 10 will drive the electric generator 30 to generate electricity at a power corresponding to the optimum economic point, and the excess energy is transferred to the power battery 40 after the wheel end is driven by the driving motor 20. If the required wheel power is greater than the electricity generation power of the electric generator 30, the engine 10 will drive at a power greater than the power corresponding to the optimum economic point following the required wheel power on a high-efficiency economic line of the engine 10. That is, the engine 10 operates on the economic line of the engine 10, but outputs more power. According to some embodiments of the present disclosure, if the required wheel power is greater than the electricity generation power of the electric generator 30 and SOC of the power battery 40 is low to a certain value, the engine 10 will further increase the power, to meet the power demand, and allow some energy to enter the power battery 40 for charging the power battery 40. That is to say, the engine 10 will increase the output power while the driving demand is met, so as to supply some energy to the power battery 40. When SOC of the power battery 40 is increased to a certain value, the controller 50 will control the engine 10 to stop operation, and the EV mode is entered. In this manner, the solely electric traveling of the hybrid vehicle 1000 can account for 81% under an electricity-deficient operating condition as shown in FIG. 3, thereby ensuring that the hybrid vehicle 1000 has high economy. The typical electricity-deficient operating condition is an electricity-deficient operating condition in an urban scenario, including frequent start and stop of vehicles, vehicle-following congestion, and medium and low vehicle speed with strict NVH restrictions.

In some embodiments of the present disclosure, the controller 50 is further configured to, when the speed of the hybrid vehicle 1000 is less than a preset vehicle speed threshold, according to SOC of the power battery 40 and the vehicle speed, determine a third wheel torque threshold T3 entering the series mode of the hybrid vehicle 1000, and control the hybrid vehicle 1000 to enter the series mode when the required wheel torque is greater than or equal to the third wheel torque threshold T3; determine a required wheel power according to the required wheel torque and the vehicle speed; control the engine 10 to operate at a preset power at an optimum economic point, so as to drive the electric generator 30 to generate electricity according to the preset power when the engine 10 operates at the optimum economic point and output power to the wheel end by the driving motor 20; charge excess power to the power battery 40 by the electric generator 30 when the electricity generation power of the electric generator 30 is greater than the required wheel power; and control the engine 10 to increase the output power, and control the engine 10 to operate on the economic line of the engine 10, so as to respond to the required wheel power, when the electricity generation power of the electric generator 30 is less than the required wheel power.

According to some embodiments of the present disclosure, the controller 50 is further configured to, when the required wheel torque is less than the third wheel torque threshold, control the engine 10 to stop operation and control the power battery 40 to power the driving motor 20, so as to respond to the required wheel torque by the power battery 40. It is to be understood that in this embodiment, at the current required wheel torque, current SOC and current vehicle speed, more energy is saved when the hybrid vehicle 1000 operates in the EV mode. Therefore, the operating mode of the vehicle is switched from the series mode to the EV mode.

That is to say, when the speed of the hybrid vehicle 1000 is small, for example, less than 65 km/h, the hybrid vehicle 1000 is controlled to enter the series mode or EV mode according to SOC of the power battery 40 and the vehicle speed. That is, at a low vehicle speed, the parallel mode cannot be entered due to the hardware limitation. In this case, the equivalent energy consumptions in the series mode and the EV mode are compared, to reduce the system computation, reduce the requirement for the processing speed of the controller 50, make the processing speed faster, reduce the use of high-speed processing chips, and save the cost.

In an embodiment, when the vehicle speed of the hybrid vehicle 1000 is less than a preset vehicle speed threshold (for example, 65 km/h), a third wheel torque threshold T3 entering the series mode of the hybrid vehicle 1000 is determined by a look-up table method according to SOC of the power battery 40 and the vehicle speed, and compared with the required wheel torque.

The controller 50 controls the hybrid vehicle 1000 to enter the series mode, when the required wheel torque is greater than or equal to the third wheel torque threshold T3. In the series mode, the controller 50 controls the engine 10 to operate at a preset power (for example, 25 kW) at the optimum economic point, acquires the required wheel torque and the vehicle speed, determine the required wheel power according to the required wheel torque and the vehicle speed, and compare it with the electricity generation power of the electric generator 30. The controller 50 controls the electric generator 30 to charge excess power to the power battery 40 if the electricity generation power of the electric generator 30 is greater than the required wheel power. The controller 50 controls the engine 10 to increase the output power and control the engine 10 to operate on the economic line of the engine 10 to provide the required wheel power, if the electricity generation power of the electric generator 30 is less than the required wheel power. According to some embodiments of the present disclosure, when the electricity generation power of the electric generator 30 is less than the required wheel power and the current SOC of the power battery 40 is less than the second preset value, the engine 10 will increase the output power while the driving demand is met, and some energy will be transferred to the power battery 40 to supplement the power in the power battery 40.

When the required wheel torque is less than the third wheel torque threshold T3, the controller 50 controls the engine 10 to stop operation, and controls the power battery 40 to power the driving motor 20, where the required wheel torque is provided by the power battery 40. At this time, the hybrid vehicle 1000 enters the EV mode.

Therefore, the hybrid vehicle 1000 is controlled to enter the series mode according to the required wheel torque of the hybrid vehicle 1000, SOC of the power battery 40, and speed of the hybrid vehicle 1000, and different modes in the series mode are used, such that the engine 10 always operates in the economic zone, thereby achieving the object of energy saving, and ensuring the high economy of the hybrid vehicle 1000. According to some embodiments of the present disclosure, the third wheel torque threshold T3 positively correlate with SOC of the power battery 40. That is to say, the third wheel torque threshold T3 varies with the SOC of the power battery 40, so as to reduce the duration of the series mode as much as possible, and allow the power battery 40 to discharge to power the driving motor 20 as much as possible. That is, electricity is used as much as possible, and the vehicle operates in the EV mode as much as possible. In practical use, the third wheel torque threshold T3 can be acquired by a look-up table method according to SOC of the power battery 40, as shown in Table 3:

TABLE 3

| SOC of power battery 40 | Third wheel torque threshold |
|---|---|
| SOC < SOC1 | T31 |
| SOC1 ≤ SOC ≤ SOC2 | T32 |
| SOC2 < SOC | T33 |

SOC1 and SOC2 are preset values, and SOC1<SOC2, and T31<T32<T33.

Figure 4:
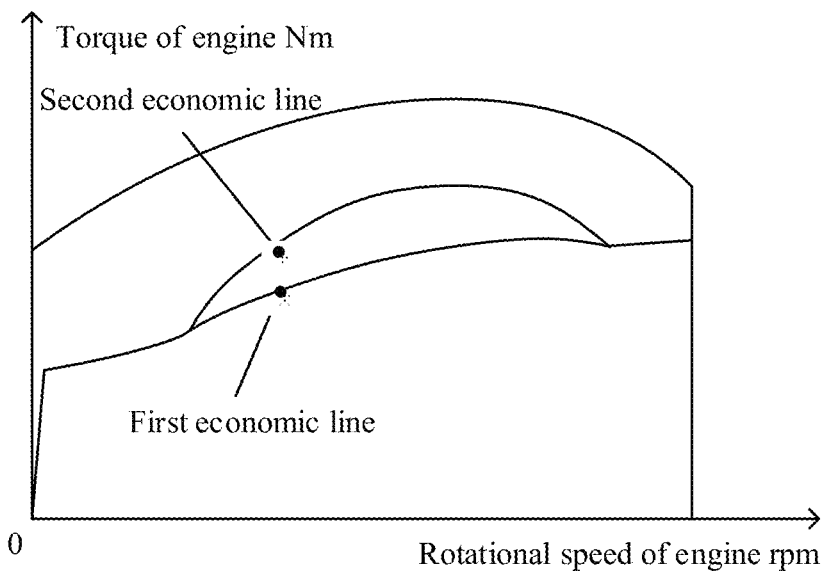
FIG. 4 is a schematic diagram showing an economic line of an engine in a series mode according to an embodiment of the present disclosure.

In some embodiments of the present disclosure, as shown in FIG. 4, the controller 50 is further configured to, when the hybrid vehicle 1000 operates in the series mode, control the engine 10 to operate on a first economic line if SOC of the power battery 40 is in a first preset interval; and control the engine 10 to operate on a second economic line if SOC of the power battery 40 is in a second preset interval. An upper limit of the second preset interval is less than or equal to a lower limit of the first preset interval. The first economic line is the optimum economic line of the series mode. At the same rotational speed, the output torque when the engine 10 operates on the second economic line is greater than or equal to the output torque when the engine 10 operates on the first economic line. In this embodiment, the second economic line can basically coincide with an external characteristic line of the engine 10, or set between the first economic line and the external characteristic line of the engine 10. The first preset interval can be such that SOC of the power battery 40 is greater than or equal to 17%, and the second preset interval can be such that SOC of the power battery 40 is less than 17%.

Figure 5:
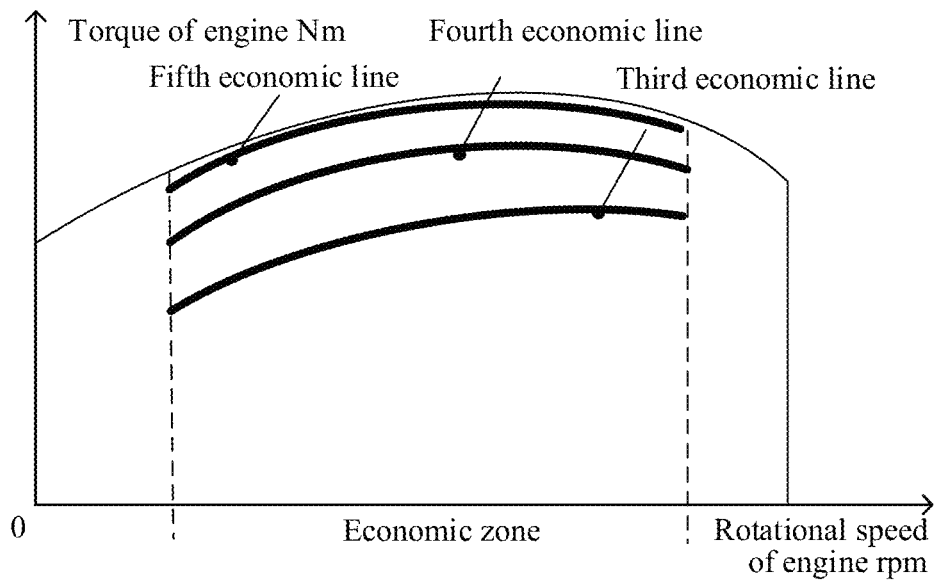
FIG. 5 is a schematic diagram showing an economic line of an engine in a parallel mode according to an embodiment of the present disclosure.

In some embodiments of the present disclosure, as shown in FIG. 5, the controller 50 is further configured to, when the hybrid vehicle 1000 operates in the parallel mode, control the engine 10 to operate on a third economic line if SOC of the power battery 40 is in a third preset interval; control the engine 10 to operate on a fourth economic line if SOC of the power battery 40 is in a fourth preset interval; and control the engine 10 to operate on a fifth economic line if SOC of the power battery 40 is in a fifth preset interval. An upper limit of the fifth preset interval is less than or equal to a lower limit of the fourth preset interval, and an upper limit of the fourth preset interval is less than or equal to a lower limit of the third preset interval. The third economic line is the optimum economic line in the parallel mode. The fifth economic line basically coincide with an external characteristic line of the engine 10, and the fourth economic line is located between the fifth economic line and the third economic line. The third preset interval may be such that SOC of the power battery 40 is greater than or equal to 25%, the fourth preset interval may be such that SOC of the power battery 40 is greater than 15% and less than 25%, and the fifth preset interval may be such that SOC of the power battery 40 is less than or equal to 15%. That is to say, the optimum operating mode of the engine 10 is always the operation on the economic lines, but not the operation in an economic area between economic lines. The economic zone in the present disclosure may be two economic lines in the series mode or three economic lines in the parallel mode in the economic zone, as described above. The present disclosure is not limited thereto, and the description is merely exemplary here. In other words, the economic line on which the engine 10 operates is movable. Therefore, when the hybrid vehicle 1000 operates at a low SOC of the power battery 40, power reservation of the power battery 40 is achieved by adjusting the economic line on which the engine 10 operates, and improving the fraction of the engine 10 involved in the driving and the output torque. The economic lines of the engine 10 in the parallel mode and the series mode are different, to achieve a low comprehensive fuel consumption of the hybrid vehicle 1000.

In summary, a series mode and a parallel mode are set for the hybrid vehicle 1000 according to the embodiment of the present disclosure, to achieve the high-efficiency operation of the engine 10 in the whole range from low- to medium- and high-speed operating conditions. Under medium- and high-speed operating conditions, the engine 10 is determined to operate in the parallel mode or the series mode according to the traveling parameter. Under low-speed operating conditions, the timing at which the engine 10 enters the series mode is determined according to the traveling parameter. Therefore, the probability of the engine 10 operating on the optimum economic line is increased, and the engine 10 always operates in the economic zone, to achieve energy saving.

In some embodiments of the present disclosure, the controller 50 is further configured to determine SOC of the power battery 40; and control the hybrid vehicle 1000 to operate in the series mode or the parallel mode and the engine 10 to operate in the economic zone, according to SOC of the power battery 40, the vehicle speed, the required wheel torque, when SOC of the power battery 40 is less than a third preset value. That is to say, when SOC of the power battery 40 is less than a third preset value (for example, 25%), the hybrid vehicle 1000 is controlled to enter the series mode or the parallel mode according to SOC of the power battery 40, the vehicle speed and the required wheel torque, and the engine 10 is controlled to operate in the economic zone when the hybrid vehicle 1000 operates in the series mode or the parallel mode, thereby avoiding the fast power drop in the case of electricity-deficient operating conditions when the hybrid vehicle 1000 operates in the EV mode, and ensuring power reservation of the power battery 40.

Figure 6A:
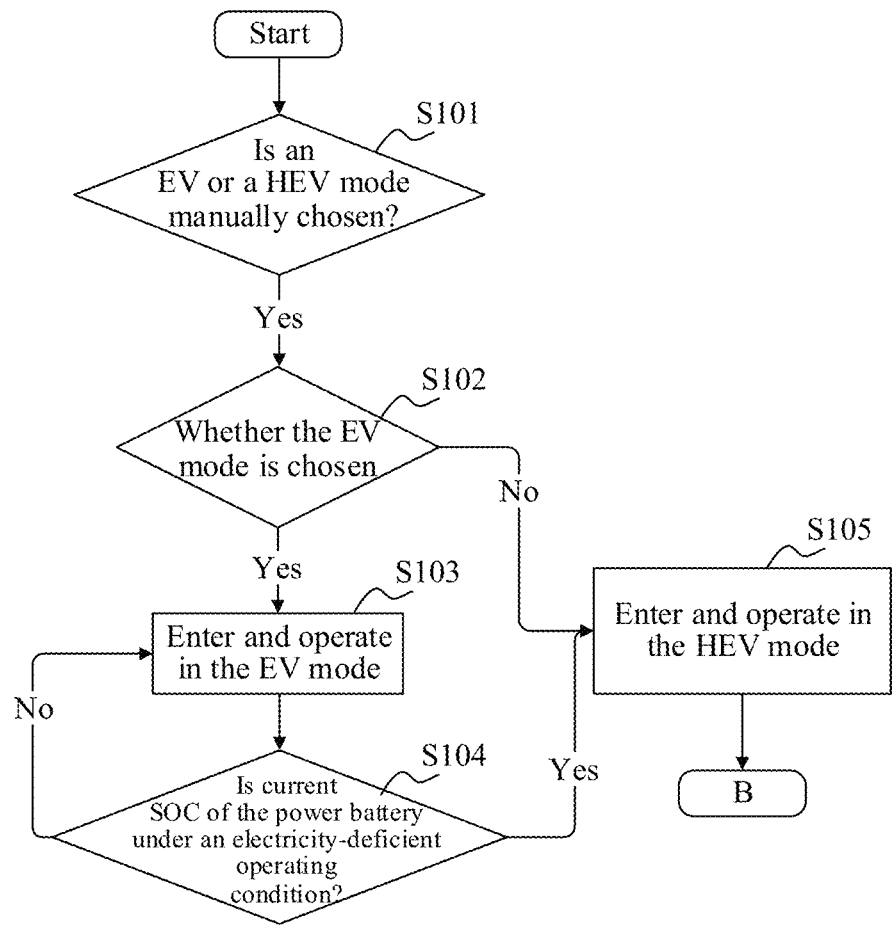
FIG. 6a and FIG. 6b is a flow chart of a process controlling a hybrid system according to an embodiment of the present disclosure.
Figure 6B:
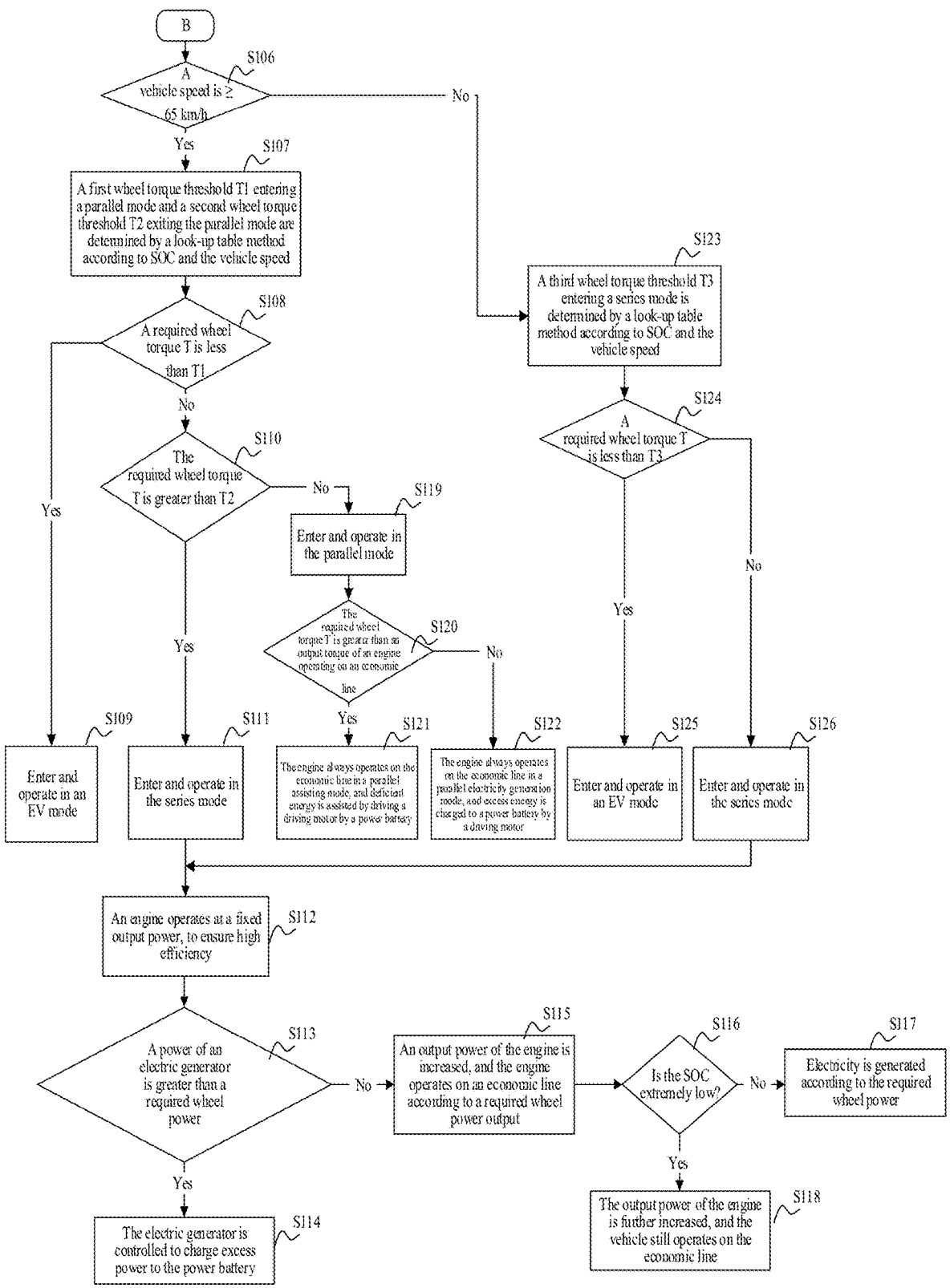

In an example, the controller 50 can be configured to control the hybrid vehicle 1000 according to a control logic shown in FIG. 6a and FIG. 6b, which includes the following steps:

Step S101: Whether to manually choose to enter the EV or HEV mode (hybrid mode) is determined. If yes, Step S102 is performed, or the vehicle continuously operates in the current mode.

Step S102: Whether the EV mode is chosen is determined. If yes, Step S103 is performed, or step S105 is performed.

Step S103: The vehicle enters and operates in the EV mode.

Step S104: Whether current SOC of the power battery 40 is under an electricity-deficient operating condition is determined. If yes, step S105 is performed, or step S103 is performed.

Step S105: The vehicle enters and operates in the HEV mode.

Step S106: Whether the vehicle speed is ≥65 km/h is determined. If yes, step S107 is performed, or step S123 is performed.

Step S107: A first wheel torque threshold T1 entering the parallel mode and a second wheel torque threshold T2 exiting the parallel mode are determined by a look-up table method according to SOC of the power battery 40 and the vehicle speed.

Step S108: Whether the required wheel torque T is less than T1 is determined. If yes, step S109 is performed, or step S110 is performed.

Step S109: The vehicle enters and operates in the EV mode.

Step S110: Whether the required wheel torque T is greater than T2 is determined. If yes, step S111 is performed, or step S119 is performed.

Step S111: The vehicle enters and operates in the series mode.

Step S112: The engine 10 operates at a fixed output power, to ensure the high efficiency.

Step S113: Whether the power of the electric generator 30 is greater than the required wheel power is determined. If yes, step S114 is performed, or step S115 is performed.

Step S114: The electric generator 30 is controlled to charge excess power to the power battery 40.

Step S115: The output power of the engine 10 is increased, and the engine 10 operates on an economic line according to the required wheel power output.

Step S116: Whether SOC of the power battery 40 is extremely low (for example, SOC of the power battery 40 is lower than a second preset value) is determined. If yes, step S118 is performed, or step S117 is performed.

Step S117: Electricity is generated according to the required wheel power.

Step S118: The output power of the engine 10 is further increased, and the vehicle still operates on the economic line.

Step S119: The vehicle enters and operates in the parallel mode.

Step S120: Whether the required wheel torque T is greater than the output torque of the engine 10 operating on the economic line is determined. If yes, step S121 is performed, or step S122 is performed.

Step S121: The engine 10 always operates on the economic line in the parallel assisting mode, and the deficient energy is assisted by driving the driving motor 20 by the power battery 40.

Step S122: The engine 10 always operates on the economic line in the parallel electricity generation mode, and the excess energy is charged to the power battery 40 by the driving motor 20.

Step S123: A third wheel torque threshold T3 entering the series mode is determined by a look-up table method according to SOC of the power battery 40 and the vehicle speed.

Step S124: Whether the required wheel torque T is less than T3 is determined. If yes, step S125 is performed, or step S126 is performed.

Step S125: The vehicle enters and operates in the EV mode.

Step S126: The vehicle enters and operates in the EV mode.

Figure 7:
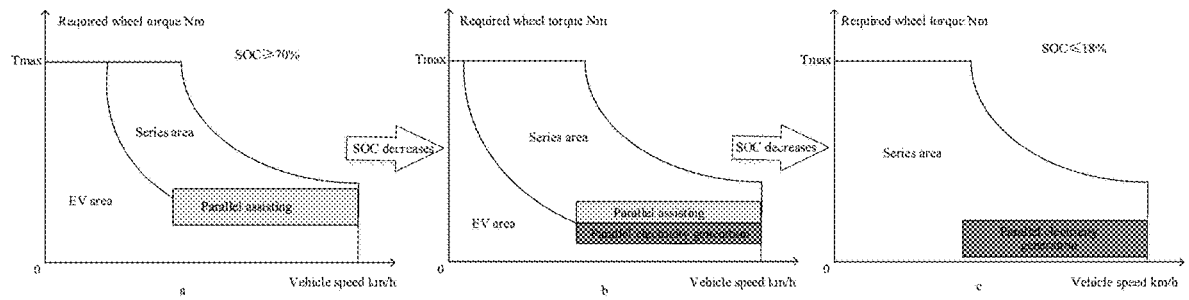
FIG. 7 is a schematic diagram showing a control policy for a hybrid system according to an embodiment of the present disclosure.

According to some embodiments of the present disclosure, a corresponding control policy is schematically shown in FIG. 7. As can be seen from FIG. 7, when SOC of the power battery 40 is high (for example, SOC is ≥70%), the vehicle travels solely relying on electricity in most time, that is, the fraction of operating zone in the EV mode is higher than that of the operating zone in the series mode. Under the medium- and high-speed operating conditions, direct driving by the engine 10 dominates, and the engine 10 operates on the optimum economic line. At the same time, the driving motor 20 assists to meet the wheel demand, that is, the vehicle enters the parallel assisting mode. Only in the case of large power demand, the vehicle enters the series electricity-generation mode to meet the wheel demand.

As shown in FIG. 7a, FIG. 7b, and FIG. 7c, as SOC of the power battery 40 decreases, the operating zone in the EV mode decreases, and the operating zone in the series mode increases. After entering direct driving by the engine 10 by traveling at a medium or high speed, the assisting torque of the driving motor 20 decreases, to slow down the descending rate of SOC of the power battery 40, and achieve power reservation of the power battery 40. In the parallel mode, when the speed at which the engine 10 participates in the operation is higher relative to SOC of the power battery 40, the involving speed is smaller and closer to the preset vehicle speed threshold.

When SOC of the power battery 40 is extremely low (for example, SOC is ≤18%), to increase the power reservation of the power battery 40 of the vehicle, the vehicle does not travel solely relying on electricity anymore, and series driving is employed at a low speed. In the series mode, the engine 10 will drive the electric generator 30 to generate some more electricity that is supplemented to the power battery 40. The zone of direct driving by the engine 10 at a high-speed decreases. After the engine 10 enters direct drying, some more electricity will be generated and supplemented to the power battery 40.

Therefore, by determining SOC of the power battery 40, and in the descending process of SOC, the priority of power reservation of the vehicle is persistently improved, and the operating zone in the EV mode is continuously reduced. The series driving includes series power following (when SOC of the power battery 40 is low) and series constant power (when SOC of the power battery 40 is high) according to different SOC of the power battery 40. In the case of series power following, the operating point of the engine 10 follows the economic line of the engine 10; and when SOC of the power battery 40 is extremely low, the output power of the engine 10 will respond to the required wheel power, and charge the power battery 40 as well. In the case of series constant power, the engine 10 will operate at a high-efficiency economic point (for example, 25 kW). If the required wheel torque cannot be met solely by driving by the engine 10, the power battery 40 outputs some energy, and the driving motor 20 is driven by both the power battery 40 and the engine 10. It can be understood that 25 KW is an exemplary economic point in this embodiment.

For example, when SOC is high and the vehicle speed is high, the wheel demand is small. At this time, the parallel mode is mainly employed, that is, direct driving by the engine 10 dominates. In the mode, the economy is good, and the energy consumption is low. For example, the electrically equivalent fuel consumption in the EV mode alone is evaluated to be about 1.5 times the fuel consumption of the engine 10 operating in the economic zone; Moreover, the NVH performance is good. For example, when the vehicle speed is 100 km/h, the rotational speed of the engine 10 in the parallel mode is about 2500 rpm, and the rotational speed of the engine 10 is greater than 3000 rpm if the series electricity-generation mode is employed. Furthermore, the power reservation is good. For example, in this mode, the power battery 40 does not discharge to the outside, and SOC of the power battery 40 basically does not drop. However, if the EV mode is employed, the power battery 40 will discharge to the outside, and SOC of the power battery 40 drops quickly. The power battery 40 has large capacity, high discharge power, and long solely electricity-relaying traveling range, leading to a good NVH performance of the vehicle traveling solely relying on electricity for a long time. The engine 10 and the driving motor 20 operates in a high efficiency interval, resulting in a low energy consumption of the vehicle.

At about the balance point of SOC of the power battery 40 or in the case of vehicle following at a low vehicle speed or under traffic congestion conditions, the EV mode is mainly adopted. In the mode, the economy is good. For example, the efficiency of the driving motor 20 is high. If the series electricity-generation mode is employed, the operation of the engine 10 in a low-efficiency zone cannot be avoided, and the electricity generation efficiency of the engine 10 is low. Moreover, the NVH performance is good in the EV mode. For example, there is no start noise of the engine 10 in this mode, and the quietness is good. If the series mode is used, the engine 10 will rotate at a speed of 1400 rpm-1600 rpm, and the experience is slightly worse.

At low SOC and large required wheel torque (such as large throttle acceleration or high driver demand), the series mode is mainly adopted, in which the power performance is good. For example, in the case of insufficient discharge capacity of the power battery 40, the engine 10 has powerful electricity generation power, to meet the driver's demand for acceleration and overtaking. In addition, the power reservation performance is good. For example, in this mode, when the discharge capacity of the power battery 40 is insufficient, the engine 10 can generate electricity according to the driver's demand. If the parallel assisting mode is used, because the engine 10 is directly connected to the wheel end and the driving demand cannot be met when the engine 10 operates in the economic zone, the power battery 40 needs to supplement a large power, so the power reservation performance becomes worse.

Therefore, in the traveling process of the vehicle, the hybrid vehicle 1000 mainly operates in the EV mode and series mode at a medium or low speed, and the hybrid vehicle 1000 is mainly directly driven by the engine 10 at a high speed. In the series mode, the engine 10 operates on the economic line, to ensure the fuel economy. When the power battery 40 is in an extremely low SOC state, the engine 10 operates on the second economic line, to improve the power reservation. In the case of direct driving by the engine 10, the engine 10 operates on the economic line at a high SOC; and as SOC decreases, the economic line on which the engine 10 operates shifts gradually toward the external characteristic line, to improve the power reservation. Therefore, the energy consumption, power and NVH performances of the hybrid vehicle 1000 can well meet the needs of users.

Figure 8A:
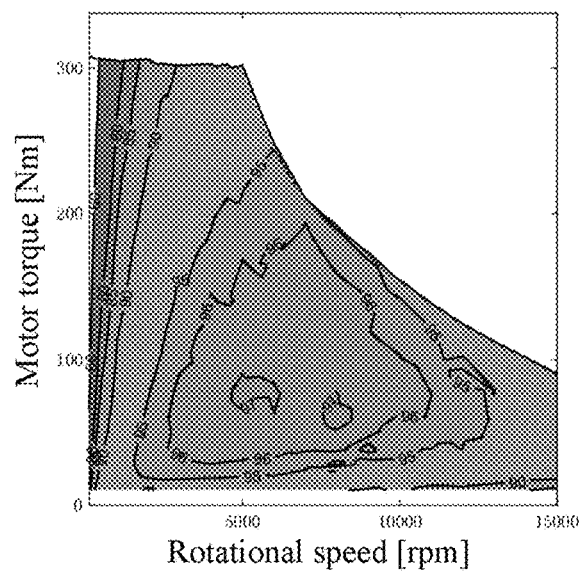
FIG. 8a and FIG. 8b is a schematic diagram showing the driving efficiency for a motor according to an embodiment of the present disclosure.
Figure 8B:
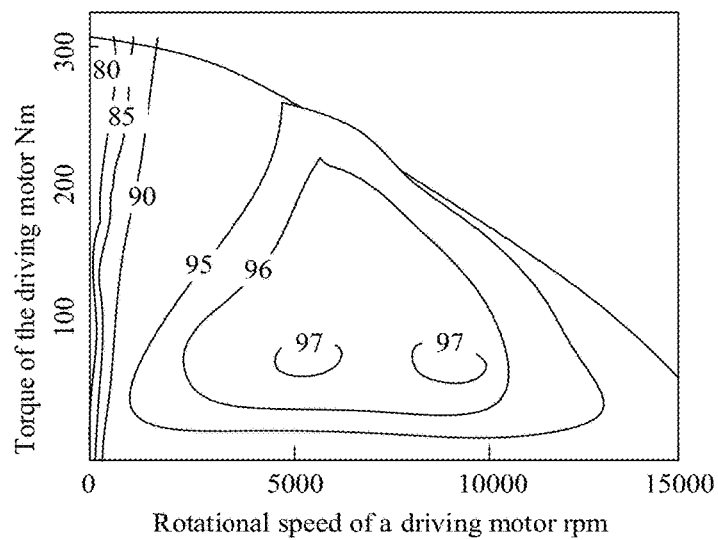
Figure 9:
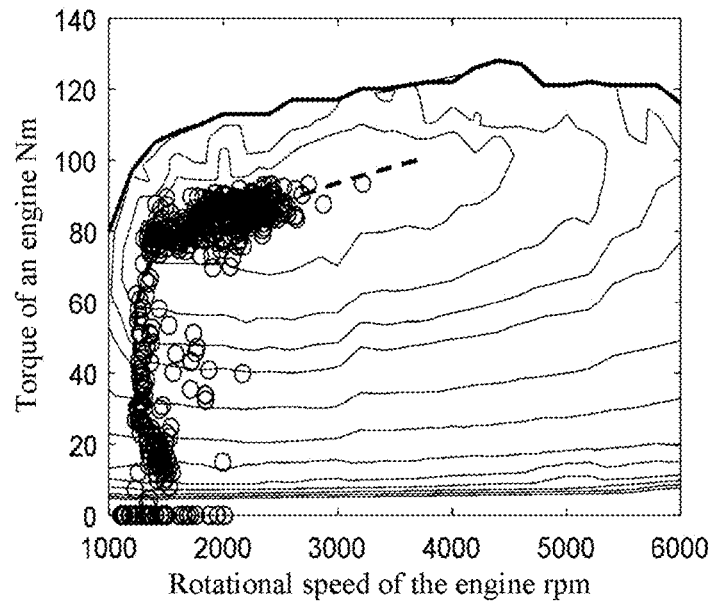
FIG. 9 is a schematic diagram showing the efficiency and an operating point of an engine according to an embodiment of the present disclosure.

It should be noted that the core underlying the control in the present disclosure is that driving by electricity dominates, and the high-efficiency operating area of the driving motor 20 almost covers the entire range of rotational speed and torque, as shown in FIG. 8a and FIG. 8b; and direct driving by the engine 10 is supplementary, and the engine 10 always operates on the optimum economic line, as shown in FIG. 9, thereby improving the fuel economy of the vehicle. The faction of the driving motor 20 in an area where the efficiency exceeds 90% is assessed to 90.7% or more, and the driving by the motor is in the high-efficiency area for a long time. The engine 10 operates in a high-efficiency range of 38% or more for 70% of the time. Because the capacity of the power battery 40 is not less than 5 kWh, the faction of traveling in the EV mode can be ensured even in a non-full power state while the engine 10 is maintained to operate in a high-efficiency range. When the engine 10 operates in the economic zone, the output power is greater than the vehicle's demand, the battery can take in excess energy, so that the vehicle can largely operates in the electrically driven mode.

Figure 10:
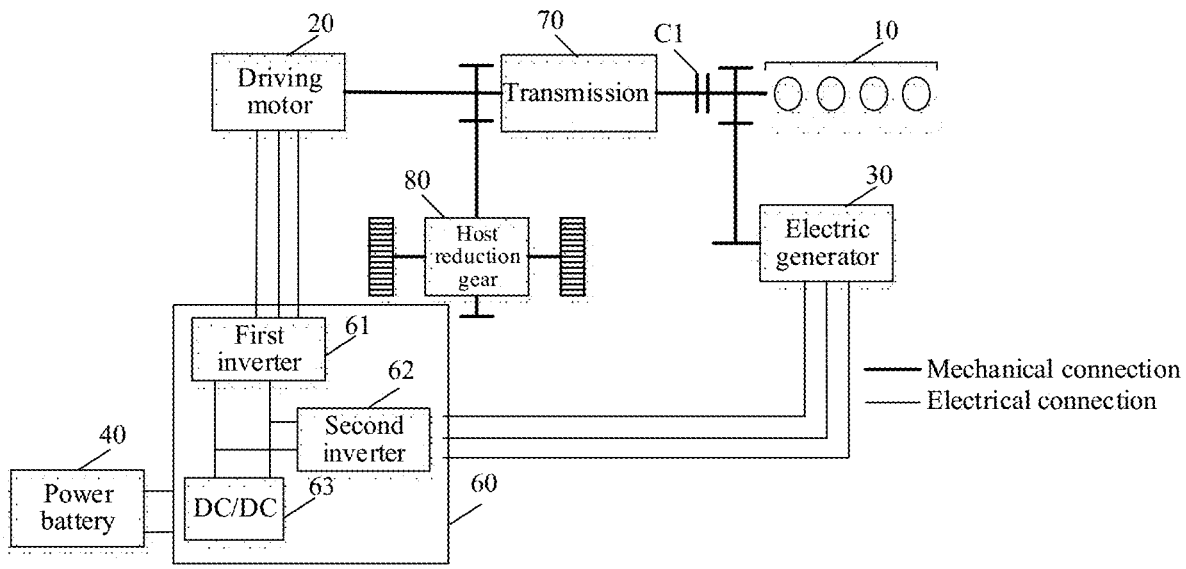
FIG. 10 is a schematic structural view of a hybrid system according to a third embodiment of the present disclosure.

In some embodiments of the present disclosure, as shown in FIG. 1a and FIG. 10, the hybrid system 100 further includes a dual electronic controller module 60. The dual electronic controller module 60 is respectively connected to the driving motor 20 and the electric generator 30, and the dual electronic controller module 60 powers the driving motor 20 by an AC current outputted by the electric generator 30. The power battery 40 is connected to the dual electronic controller module 60, and the power battery 40 powers the driving motor 20 by the dual electronic controller module 60, or is charged by the dual electronic controller module 60 with an AC current outputted by the electric generator 30 or the driving motor 20. The maximum operating power of the electric generator 30 is greater than or equal to the first preset power, and the maximum operating power of the engine 10 is greater than or equal to the second preset power. The second preset power is greater than or equal to the first preset power, and a difference between the second preset power and the first preset power is less than 5%-10% of the second preset power.

According to some embodiments of the present disclosure, the capacity of the power battery 40 is greater than or equal to the first preset capacity. For example, the first preset capacity is 5 kWh to 25 kWh. The first preset power can be set to 70 kW, and the second preset power can be set to 81 kW.

It should be noted that in the present disclosure, the power battery 40 has a large capacity, so that the hybrid vehicle 1000 operates in the EV mode in 80% of the operating time; and the large capacity of the power battery 40 allows for the balance of the operation of the engine 10 by charging and discharging, so that the engine 10 can always operate in high efficiency when it is in an operating state, for driving or electricity generation (referring to the foregoing description for details). Moreover, the electric generator 30 is large, and the corresponding electricity generation power is larger, so that rapid power supplementation can be achieved. The time for increasing SOC of the power battery 40 from 20% to 25% is about 5 min. That is, it takes about 1 min to generate electricity in situ. Moreover, there is little difference in the maximum operating power between the electric generator 30 and the engine 10, so that the electric generator 30 can make full use of the effective power of the engine 10, to avoid energy waste. In the above arrangement, the engine 10 is the energy source, the electric generator 30 is the pipeline for energy flow, and the battery is the reservoir. The source, the pipeline, and the reservoir suffer no bottleneck for energy flow. That is, the parameters of the engine 10, and the electric generator 30, and the battery can be coordinated to realize the efficient and reasonable utilization of energy.

In some embodiments of the present disclosure, as shown in FIG. 10, the dual electronic controller module 60 includes a first inverter 61, a second inverter 62 and a DC/DC 63. An AC terminal of the first inverter 61 is connected to the driving motor 20, a DC terminal of the first inverter 61 is respectively connected to a DC terminal of the second inverter 62 and a first DC terminal of the DC/DC 63, an AC terminal of the second inverter 62 is connected to the electric generator 30, and a second DC terminal of the DC/DC 63 is connected to the power battery 40.

According to some embodiments of the present disclosure, the maximum operating power of the DC/DC 63 is greater than a third preset power. The third preset power is greater than the second preset power, for example, the third preset power can be set to 90 kW. Therefore, the capacity of the power battery 40 can be fully utilized, and the maximum power of the power battery 40 can be outputted to the driving motor 20.

According to some embodiments of the present disclosure, the difference between the third preset power and the second preset power is less than 5%-10% of the third preset power. In this way, regardless of SOC of the power battery 40, the electricity generation power of the engine 10 causes the driving motor 20 to be in a high-efficiency range for most time. Because the third preset power is close to the maximum operating power of the driving motor 20, the power waste caused by surplus power is effectively avoided.

The operating states of the dual electronic controller module 60 when the hybrid vehicle 1000 operates in various operating modes will be described with reference to FIG. 10 hereinafter. In some embodiments of the present disclosure, as shown in FIG. 10, when the power output between the engine 10 and the wheel end is cut off and the electric generator 3010 is driven to generate electricity, the hybrid system 100 enters the series mode. An AC current outputted by the electric generator 30 is converted into a DC current by the second inverter 62, and the DC current is converted by the first inverter 61 into an AC current, which is then supplied to the driving motor 20, so that the driving motor 20 can operate for driving work. Alternatively, an AC current outputted by the electric generator 30 is converted into a DC current by the second inverter 62, and the DC current is converted by the first inverter 61 into an AC current, which is then supplied to the driving motor 20; and at the same time, a DC current outputted by the power battery 40 is converted by the DC/DC 63, and then the DC current is converted by the first inverter 61 into an AC current, which is then supplied to the driving motor 20, so that the driving motor 20 can operate for driving work. Alternatively, an AC current outputted by the electric generator 30 is converted into a DC current by the second inverter 62, and the DC current is converted by the first inverter 61 into an AC current, which is then supplied to the driving motor 20, so that the driving motor 20 can operate for driving work. At the same time, the DC current is converted by the DC/DC 63 and then charged to the power battery 40.

In some embodiments of the present disclosure, when the engine 10 and the electric generator 30 do not operate and the power battery 40 powers the driving motor 20, the hybrid system 100 enters the EV mode. A DC current outputted by the power battery 40 flows through the DC/DC 63, and then the DC current is converted by the first inverter 61 into an AC current, which is then supplied to the driving motor 20, so that the driving motor 20 can operate for driving work.

In some embodiments of the present disclosure, when power coupling is enabled between the engine 10 and the wheel end, the electric generator 30 is idle, and the engine 10 drives the driving motor 20 to generate electricity, the hybrid system 100 enters the parallel power-generation mode. An AC current outputted by the driving motor 20 is converted into a DC current by the first inverter 61, and then the DC current is converted by the DC/DC 63 and charged to the power battery 40.

Therefore, in the parallel power generation mode, the driving motor 20 can be used to generate electricity. Because of the large power of the driving motor 20, the power supplementation is faster, and the loss when the electric generator 30 is idle is less than the loss when the driving motor 20 is idle, so the energy is saved.

In some embodiments of the present disclosure, when power coupling is enabled between the engine 10 and the wheel end, the electric generator 30 is idle, and the power battery 40 powers the driving motor 20, the hybrid system 100 enters the parallel assisting mode. A DC current outputted by the power battery 40 is converted by the DC/DC 63, and then the DC current is converted by the first inverter 61 into an AC current, which is then supplied to the driving motor 20, so that the driving motor 20 can operate for driving work. At the same time, the engine 10 outputs power to the wheel end so as to participate in the driving work.

The hybrid system 100 according to the embodiment of the present disclosure allows the hybrid vehicle 1000 to be mainly driven by electricity, supplemented by driving by fuel. By comprehensively considering the current vehicle speed, the actually required torque, SOC of the power battery 40, and the high-efficiency range of the engine 10 and the driving motor 20, the vehicle is preferentially driven in a high-efficiency mode, and the mode is switched according to the power performance of the vehicle and power reservation performance of the battery, so that the energy consumption, power performance, and NVH of the hybrid vehicle 1000 can well meet the user's demand.

Figure 11:
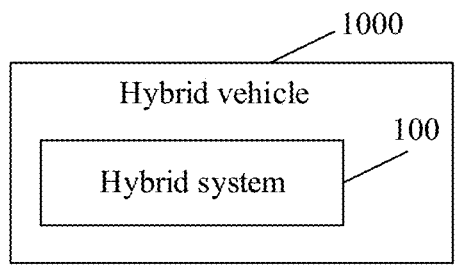
FIG. 11 is a schematic diagram of a hybrid vehicle according to an embodiment of the present disclosure.

FIG. 11 is a schematic structural view of a hybrid vehicle 1000 according to an embodiment of the present disclosure. As shown in FIG. 11, the hybrid vehicle 1000 includes the hybrid system 100 above.

The hybrid vehicle 1000 according to the embodiment of the present disclosure is enabled, by the hybrid system 100 as described above, to enable the hybrid vehicle 1000 to operate with a low energy consumption in an operation mode of minimum equivalent fuel consumption according to the traveling parameter, thereby effectively improving the economy of the hybrid vehicle 1000, and meeting the user's expectation during use.

Figure 12:
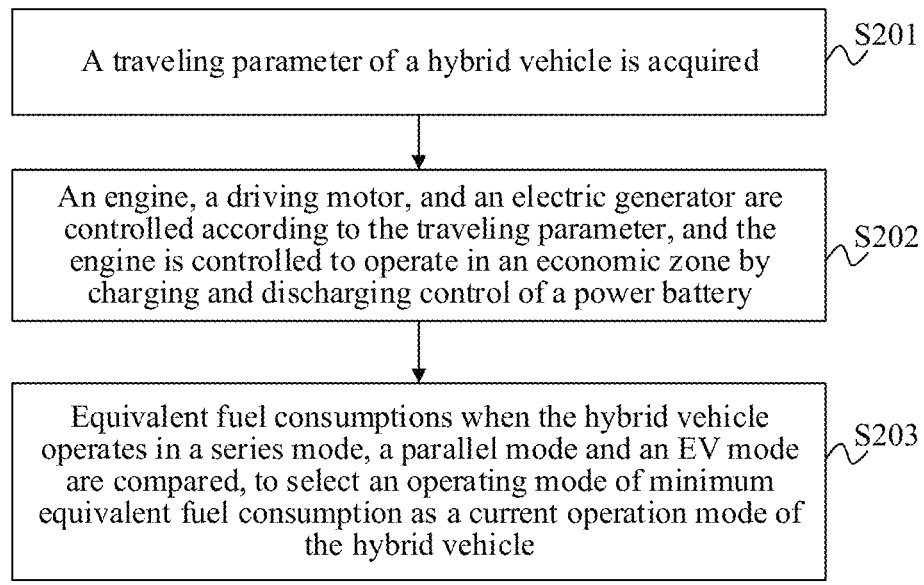
FIG. 12 is a flow chart of a control method for a hybrid vehicle according to an embodiment of the present disclosure.

FIG. 12 is a flow chart of a control method for the hybrid vehicle 1000 according to an embodiment of the present disclosure. As shown in FIG. 1a, the hybrid vehicle 1000 includes an engine 10, a driving motor 20, an electric generator 30, and a power battery 40. The engine 10 is configured to selectively output power to a wheel end. The driving motor 20 is configured to output power to the wheel end. The electric generator 30 is connected to the engine 10 and driven by the engine 10 to generate electricity. The power battery 40 is configured to supply electricity to the driving motor 20 and be charged with an alternating current outputted by the electric generator 30 or the driving motor 20, where the capacity of the power battery 40 is greater than or equal to a first preset capacity.

As shown in FIG. 12, the control method for the hybrid vehicle 1000 includes the following steps: Step S201: A traveling parameter of the hybrid vehicle 1000 is acquired.

Step S202: The engine 10, the driving motor 20 and the electric generator 30 are controlled according to the traveling parameter, and the engine 10 is controlled to operate in an economic zone by the charging and discharging control of the power battery 40.

Step S203: Equivalent fuel consumptions when the hybrid vehicle 1000 operates in the series mode, parallel mode and EV mode are compared, to select an operating mode of minimum equivalent fuel consumption as a current operation mode of the hybrid vehicle 1000.

In some embodiments of the present disclosure, when the engine 10 operates in the economic zone, if SOC of the power battery 40 is greater than or equal to a first preset value, the engine 10 is controlled to operate on an optimum economic line. Alternatively, if SOC of the power battery 40 is less than the first preset value and the output power of the engine 10 is greater than or equal to the required wheel power, the engine 10 is controlled to operate on the optimum economic line. The first preset value inversely correlates with the first preset capacity.

In some embodiments of the present disclosure, when the hybrid vehicle 1000 is in the series mode, the engine 10 charges the power battery 40 by the electric generator 30. When the hybrid vehicle 1000 is in the parallel mode, the engine 10 charges the power battery 40 by the driving motor 20.

In some embodiments of the present disclosure, the traveling parameter includes at least one of the required wheel torque, SOC of the power battery 40, and vehicle speed of the hybrid vehicle 1000.

In some embodiments of the present disclosure, the step of controlling the engine 10, the driving motor 20 and the electric generator 30 according to the traveling parameter when the hybrid vehicle 1000 is in the parallel mode includes: determining the required wheel torque; controlling the engine 10 to operate on the economic line to respond to the required wheel torque when the required wheel torque is less than the output torque when the engine 10 operates on the economic line, and controlling the engine 10 to drive the driving motor 20 to generate electricity, so as to charge excess energy outputted by the engine 10 to the power battery 40 by the driving motor 20; and controlling the engine 10 to operate on the economic line, when the required wheel torque is greater than the output torque when the engine 10 operates on the economic line, and controlling the power battery 40 to power the driving motor 20, so both the power battery 40 and the engine 10 respond to the required wheel torque.

In some embodiments of the present disclosure, the step of controlling the engine 10, the driving motor 20 and the electric generator 30 according to the traveling parameter when the hybrid vehicle 1000 is in the series mode includes: determining a required wheel power according to the required wheel torque and the vehicle speed; controlling the engine 10 to operate on an economic line, so as to drive the electric generator 30 to generate electricity according to an output torque when the engine 10 operates on the economic line and output power to the wheel end by the driving motor 20; charging excess power to the power battery 40 by the electric generator 30 when the electricity generation power of the electric generator 30 is greater than the required wheel power; and controlling the power battery 40 to power the driving motor 20, so both the engine 10 and the power battery 40 respond to the required wheel power, when the electricity generation power of the electric generator 30 is less than the required wheel power.

In some embodiments of the present disclosure, the step of controlling the engine 10, the driving motor 20 and the electric generator 30 according to the traveling parameter includes: determining a first wheel torque threshold entering the parallel mode and a second wheel torque threshold exiting the parallel mode of the hybrid vehicle 1000 according to SOC of the power battery 40 and the speed of the hybrid vehicle 1000 when the speed of the hybrid vehicle 1000 is greater than or equal to a preset vehicle speed threshold, and controlling the hybrid vehicle 1000 to enter the parallel mode when the required wheel torque is greater than or equal to the first wheel torque threshold and less than or equal to the second wheel torque threshold; control the engine 10 to operate on the economic line, and control the power battery 40 to power the driving motor 20, so both the engine 10 and the power battery 40 respond to the required wheel torque, when the required wheel torque is greater than the output torque when the engine 10 operates on the economic line; controlling the engine 10 to operate on the economic line to respond to the required wheel torque, and controlling the engine 10 to drive the driving motor 20 to generate electricity, so as to charge excess energy outputted by the engine 10 to the power battery 40 by the driving motor 20, if the required wheel torque is less than the output torque when the engine 10 operates on the economic line; and controlling the engine 10 to operate on the economic line, to respond to the required wheel torque independently if the required wheel torque is equal to the output torque when the engine 10 operates on the economic line.

In some embodiments of the present disclosure, the step of controlling the engine 10, the driving motor 20 and the electric generator 30 according to the traveling parameter further includes: controlling the engine 10 to stop operation and controlling the power battery 40 to power the driving motor 20, so as to respond to the required wheel torque by the power battery 40, when the required wheel torque is less than the first wheel torque threshold.

In some embodiments of the present disclosure, the step of controlling the engine 10, the driving motor 20 and the electric generator 30 according to the traveling parameter further includes: controlling the hybrid vehicle 1000 to enter the series mode, when the required wheel torque is greater than the second wheel torque threshold; determining a required wheel power according to the required wheel torque and the vehicle speed; controlling the engine 10 to operate at a preset power at an optimum economic point, so as to drive the electric generator 30 to generate electricity according to the preset power when the engine 10 operates at the optimum economic point, and outputting power to the wheel end by the driving motor 20; charging excess power to the power battery 40 by the electric generator 30 when the electricity generation power of the electric generator 30 is greater than the required wheel power; and controlling the engine 10 to increase the output power, and controlling the engine 10 to operate on the economic line of the engine 10, so as to respond to the required wheel power, when the electricity generation power of the electric generator 30 is less than the required wheel power.

In some embodiments of the present disclosure, the step of controlling the engine 10, the driving motor 20 and the electric generator 30 according to the traveling parameter further includes: determining a third wheel torque threshold entering the series mode of the hybrid vehicle 1000 according to SOC of the power battery 40 and the vehicle speed, when the speed of the hybrid vehicle 1000 is less than a preset vehicle speed threshold, and controlling the hybrid vehicle 1000 to enter the series mode when the required wheel torque is greater than or equal to the third wheel torque threshold; determining a required wheel power according to the required wheel torque and the vehicle speed; controlling the engine 10 to operate at a preset power at an optimum economic point, so as to drive the electric generator 30 to generate electricity according to the preset power when the engine 10 operates at the optimum economic point, and outputting power to the wheel end by the driving motor 20; charging excess power to the power battery 40 by the electric generator 30 when the electricity generation power of the electric generator 30 is greater than the required wheel power; and controlling the engine 10 to increase the output power, and controlling the engine 10 to operate on the economic line of the engine 10, so as to respond to the required wheel power, when the electricity generation power of the electric generator 30 is less than the required wheel power.

In some embodiments of the present disclosure, the step of controlling the engine 10, the driving motor 20 and the electric generator 30 according to the traveling parameter further includes: determining whether the current SOC of the power battery 40 is less than a second preset value when the electricity generation power of the electric generator 30 is less than the required wheel power, and controlling the engine 10 to further increase the output power if yes, so as to control the output power of the engine 10 to respond to the required wheel power, and charge the power battery 40 by the electric generator 30.

In some embodiments of the present disclosure, the step of controlling the engine 10, the driving motor 20 and the electric generator 30 according to the traveling parameter further includes: controlling the engine 10 to stop operation and controlling the power battery 40 to power the driving motor 20, so as to respond to the required wheel torque by the power battery 40, when the required wheel torque is less than the third wheel torque threshold.

In some embodiments of the present disclosure, when the hybrid vehicle 1000 operates in the series mode, the engine 10 is controlled to operate on a first economic line if SOC of the power battery 40 is in a first preset interval; and the engine 10 is controlled to operate on a second economic line if SOC of the power battery 40 is in a second preset interval. An upper limit of the second preset interval is less than or equal to a lower limit of the first preset interval. At the same rotational speed, the output torque when the engine 10 operates on the second economic line is greater than or equal to the output torque when the engine 10 operates on the first economic line.

In some embodiments of the present disclosure, when the hybrid vehicle 1000 operates in the parallel mode, the engine 10 is controlled to operate on a third economic line if SOC of the power battery 40 is in a third preset interval; the engine 10 is controlled to operate on a fourth economic line if SOC of the power battery 40 is in a fourth preset interval; and the engine 10 is controlled to operate on a fifth economic line if SOC of the power battery 40 is in a fifth preset interval. An upper limit of the fifth preset interval is less than or equal to a lower limit of the fourth preset interval, and an upper limit of the fourth preset interval is less than or equal to a lower limit of the third preset interval. The third economic line is the optimum economic line in the parallel mode. The fifth economic line basically coincide with an external characteristic line of the engine 10, and the fourth economic line is located between the fifth economic line and the third economic line.

In some embodiments of the present disclosure, when the hybrid vehicle 1000 operates in the EV mode, the hybrid vehicle 1000 is controlled to operate in the series mode or the parallel mode and the engine 10 is controlled to operate in the economic zone according to SOC of the power battery 40, the vehicle speed and the required wheel torque if SOC of the power battery 40 is less than the third preset value.

It should be noted that the description of the control method for the hybrid vehicle 1000 according to the present disclosure can be made reference to the description of the hybrid system 100 according to the present disclosure, and details will not be given here again.

In the control method for the hybrid vehicle 1000 according to the embodiment of the present disclosure, a traveling parameter of the hybrid vehicle 1000 is acquired; the engine 10, the driving motor 20, and the electric generator 30 are controlled according to the traveling parameter, to enable the engine 10 to operate in an economic zone, by charging and discharging control of the power battery 40; and the equivalent fuel consumptions when the hybrid vehicle 1000 is in the series mode, parallel mode, and EV mode are compared, to select an operation mode of minimum equivalent fuel consumption as a current operation mode of the hybrid vehicle 1000. In this way, the hybrid vehicle 1000 is allowed to operate with a low energy consumption in an operation mode of minimum equivalent fuel consumption according to the traveling parameter, thereby effectively improving the economy of the hybrid vehicle 1000, and meeting the user's expectation during use.

In some embodiments, a computer-readable storage medium is further provided, on which a control program for the hybrid vehicle 1000 is stored. When the control program for the hybrid vehicle 1000 is executed by the processor 2200, the control method for the hybrid vehicle 1000 is implemented.

The computer-readable storage medium according to the embodiment of the present disclosure enables, by the control method for the hybrid vehicle 1000 as described above, the hybrid vehicle 1000 to operate with a low energy consumption in an operation mode of minimum equivalent fuel consumption according to the traveling parameter, thereby effectively improving the economy of the hybrid vehicle 1000, and meeting the user's expectation during use.

Figure 13:
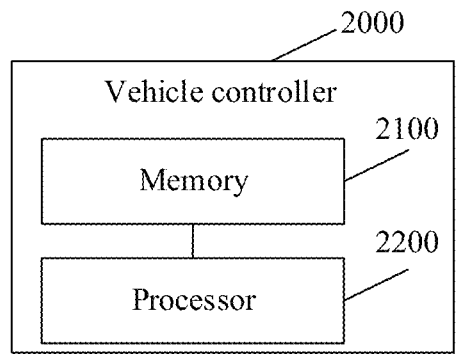
FIG. 13 is a schematic diagram of a vehicle controller according to an embodiment of the present disclosure.

FIG. 13 is a schematic structural view of a vehicle controller 2000 according to an embodiment of the present disclosure. As shown in FIG. 13, the vehicle controller 2000 includes a memory 2100, a processor 2200, and a control program for the hybrid vehicle 1000 stored on the memory 2100 and running on the processor 2200. When the control program for the hybrid vehicle 1000 is implemented by the processor 2200, the control method for the hybrid vehicle 1000 is implemented.

The vehicle controller 2000 according to the embodiment of the present disclosure enables, by the control method for the hybrid vehicle 1000 as described above, the hybrid vehicle 1000 to operate with a low energy consumption in an operation mode of minimum equivalent fuel consumption according to the traveling parameter, thereby effectively improving the economy of the hybrid vehicle 1000, and meeting the user's expectation during use.

It should be noted that the logic and/or steps shown in the flowcharts or described otherwise herein, for example, a sequenced list that may be considered as executable instructions used for implementing logical functions, may be implemented in any computer-readable medium for use by an instruction execution system, apparatus, or device (for example, a computer-based system, a system including the processor 2200, or other systems that can obtain an instruction from the instruction execution system, apparatus, or device and execute the instruction) or for use with such instruction execution systems, apparatuses, or devices. In the context of this specification, a "computer-readable medium" may be any apparatus that can include, store, communicate, propagate, or transmit the program for use by the instruction execution system, apparatus, or device or in combination with the instruction execution system, apparatus, or device. More examples (a non-exhaustive list) of the computer-readable medium include the following: an electrical connection (electronic device) having one or more wires, a portable computer diskette (magnetic apparatus), a random access memory (RAM) 2100, a read-only memory (ROM) 2100, an erasable programmable read-only memory 2100 (EPROM or flash memory 2100), an optical fiber apparatus, and a portable compact disk read-only memory (CD-ROM) 2100. In addition, the computer-readable medium can even be paper or other suitable media on which the program can be printed, because the program can be obtained electronically by, for example, optically scanning the paper or other media, then editing, interpreting, or processing in other suitable ways if necessary, and then stored in a computer memory 2100.

It should be understood that various parts of the present disclosure can be implemented by hardware, software, firmware, or a combination thereof. In the foregoing implementations, steps or methods can be implemented by software or firmware that is stored in a memory 2100 and executed by a proper instruction execution system. For example, if hardware is used for implementation, same as in another implementation, implementation may be performed by any one of the following technologies well known in the art or a combination thereof: a discrete logic circuit including a logic gate circuit for implementing a logic function of a data signal, a dedicated integrated circuit including a proper combined logic gate circuit, a programmable gate array (PGA), a field programmable gate array (FPGA), and the like.

In the description of the specification, the description with reference to the terms "an embodiment", "some embodiments", "example", "specific example", or "some example" and so on means that features, structures, materials or characteristics described in connection with the embodiment or example are embraced in at least one embodiment or example of the present disclosure. In this specification, exemplary descriptions of the foregoing terms do not necessarily refer to the same embodiment or example. Moreover, the described features, structures, materials or characteristics may be combined in any suitable manner in one or more embodiments.

In addition, the terms "first" and "second" are used merely for the purpose of description, and shall not be construed as indicating or implying relative importance or implying a quantity of indicated technical features. Therefore, the features defined by "first", and "second" may explicitly or implicitly include at least one of the features. In the descriptions of the present disclosure, unless explicitly specified, "multiple" means at least two, for example, two or three.

In the present disclosure, it should be noted that unless otherwise explicitly specified and limited, the terms "mount", "connect", "connection", and "fix" should be understood in a broad sense. For example, a connection may be a fixed connection, a detachable connection, or an integral connection; or the connection may be a mechanical connection or an electrical connection; or the connection may be a direct connection, an indirect connection through an intermediary, or internal communication between two elements or mutual action relationship between two elements, unless otherwise specified explicitly. For those of ordinary skill in the art, the meanings of the above terms in the present disclosure can be understood according to situations.

Although the embodiments of the present disclosure have been illustrated and described above, it is to be understood that the above embodiments are exemplary and not to be construed as limiting the present disclosure, and that changes, modifications, substitutions and alterations can be made by those skilled in the art without departing from the scope of the present disclosure.

What is claimed is:

1. A method for controlling a hybrid vehicle, the hybrid vehicle comprising an engine, a driving motor, an electric generator, and a power battery, the engine being configured to output power to a wheel end, the driving motor being configured to output power to the wheel end, the electric generator being connected to the engine and driven by the engine to generate electricity, the power battery being configured to supply electricity to the driving motor and be charged with an alternating current outputted by the electric generator or the driving motor, and a capacity of the power battery being greater than or equal to a first capacity, and the method comprising:
acquiring a traveling parameter of the hybrid vehicle, wherein the traveling parameter comprises a wheel torque, a state of charge (SOC) of the power battery, and a vehicle speed of the hybrid vehicle;
controlling the engine, the driving motor, and the electric generator according to the wheel torque, the SOC of the power battery, and the vehicle speed of the hybrid vehicle, to enable the engine to operate in an economic zone by controlling charging and discharging of the power battery;
comparing equivalent fuel consumptions of a series mode, a parallel mode, and an EV mode of the hybrid vehicle, and determining a minimum equivalent fuel consumption among the equivalent fuel consumptions; and
selecting one of the series mode, the parallel mode, or the EV mode having the minimum equivalent fuel consumption as a current operation mode of the hybrid vehicle.

2. The method according to claim 1, wherein when the engine operates in the economic zone,
in response to that the SOC of the power battery is greater than or equal to a first value, the engine is controlled to operate on an optimum economic line; or in response to that the SOC of the power battery is less than the first value and an output power of the engine is greater than or equal to a wheel power, the engine is controlled to operate on the optimum economic line, and
the first value inversely correlates with the first capacity.

3. The method according to claim 1, wherein
when the hybrid vehicle is in the series mode, the engine charges the power battery by the electric generator; and
when the hybrid vehicle is in the parallel mode, the engine charges the power battery by the driving motor.

4. The method according to claim 1, wherein when the hybrid vehicle is in the parallel mode, the controlling the engine, the driving motor, and the electric generator according to the traveling parameter, comprises:
determining the wheel torque;
in response to that the wheel torque is less than an output torque when the engine operates on an economic line, controlling the engine to remain operating on the economic line to support the wheel torque, and controlling the engine to drive the driving motor to generate electricity to charge the power battery with an excess power outputted from the engine by the driving motor; and
in response to that the wheel torque is greater than the output torque when the engine operates on the economic line, controlling the engine to remain operating on the economic line, and controlling the power battery to power the driving motor, so that the power battery and the engine both support the wheel torque.

5. The method according to claim 1, wherein when the hybrid vehicle is in the series mode, the controlling the engine, the driving motor, and the electric generator according to the traveling parameter, comprises:
determining a wheel power according to the wheel torque and the vehicle speed;
controlling the engine to operate on an economic line, to drive the electric generator to generate electricity according to an output torque when the engine operates on the economic line, and to output power to the wheel end by the driving motor;
in response to that an electricity power generated by the electric generator is greater than the wheel power, charging the power battery with an excess power by the electric generator; and
in response to that the electricity power generated by the electric generator is less than the wheel power, controlling the power battery to power the driving motor, so that the engine and the power battery both support the wheel power.

6. The method according to claim 1, wherein the controlling the engine, the driving motor, and the electric generator according to the traveling parameter, comprises:
determining a first wheel torque threshold entering the parallel mode and a second wheel torque threshold exiting the parallel mode according to the SOC of the power battery and the vehicle speed of the hybrid vehicle in response to that the vehicle speed of the hybrid vehicle is greater than or equal to a vehicle speed threshold, and controlling the hybrid vehicle to enter the parallel mode in response to that the wheel torque is greater than or equal to the first wheel torque threshold and less than or equal to the second wheel torque threshold;
in response to that the wheel torque is greater than an output torque when the engine operates on an economic line, controlling the engine to remain operating on the economic line, and controlling the power battery to power the driving motor, so that the engine and the power battery both support the wheel torque;
in response to that the wheel torque is less than the output torque when the engine operates on the economic line, controlling the engine to remain operating on the economic line to support the wheel torque, and controlling the engine to drive the driving motor to generate electricity to charge the power battery with an excess power outputted from the engine by the driving motor; and
in response to that the wheel torque is equal to the output torque when the engine operates on the economic line, controlling the engine to remain operating on the economic line, to support the wheel torque.

7. The method according to claim 6, wherein the first wheel torque threshold and the second wheel torque threshold positively correlate with the SOC of the power battery.

8. The method according to claim 6, wherein when the hybrid vehicle operates in the parallel mode, a vehicle speed when the engine is operated inversely correlates with the SOC of the power battery.

9. The method according to claim 6, wherein the controlling the engine, the driving motor, and the electric generator according to the traveling parameter, further comprises:
in response to that the wheel torque is less than the first wheel torque threshold, controlling the engine to stop, and controlling the power battery to power the driving motor to support the wheel torque by the power battery.

10. The method according to claim 6, wherein the controlling the engine, the driving motor, and the electric generator according to the traveling parameter, further comprises:
in response to that the wheel torque is greater than the second wheel torque threshold, controlling the hybrid vehicle to enter the series mode;
determining a wheel power according to the wheel torque and the vehicle speed;

controlling the engine to operate at a power at an optimum economic point, to drive the electric generator to generate electricity according to the power when the engine operates at the optimum economic point, and outputting a power to the wheel end by the driving motor;

in response to that an electricity generation power of the electric generator is greater than the wheel power, charging the power battery with an excess power by the electric generator; and in response to that the electricity generation power of the electric generator is less than the wheel power, controlling the engine to increase an output power, and controlling the engine to operate on the economic line to support the wheel power.

11. The method according to claim 6, wherein the controlling the engine, the driving motor, and the electric generator according to the traveling parameter, further comprises:

in response to that the vehicle speed of the hybrid vehicle is less than a vehicle speed threshold, determining a third wheel torque threshold entering the series mode of the hybrid vehicle according to the SOC of the power battery and the vehicle speed; and in response to that the wheel torque is greater than or equal to the third wheel torque threshold, controlling the hybrid vehicle to enter the series mode;

determining a wheel power according to the wheel torque and the vehicle speed;

controlling the engine to operate at a power at an optimum economic point, to drive the electric generator to generate electricity according to the power when the engine operates at the optimum economic point, and outputting a power to the wheel end by the driving motor;

in response to that an electricity generation power of the electric generator is greater than the wheel power, charging the power battery with an excess power by the electric generator; and in response to that the electricity generation power of the electric generator is less than the wheel power, controlling the engine to increase an output power, and controlling the engine to operate on the economic line to support the wheel power.

12. The method according to claim 10, wherein the controlling the engine, the driving motor, and the electric generator according to the traveling parameter, further comprises:

in response to that the electricity generation power of the electric generator is less than the wheel power, determining whether the SOC of the power battery is less than a second value, and in response to that the SOC of the power battery is less than the second value, controlling the engine to increase the output power, to support the wheel power and to charge the power battery by the electric generator.

13. The method according to claim 11, wherein the controlling the engine, the driving motor, and the electric generator according to the traveling parameter, further comprises:

in response to that the wheel torque is less than the third wheel torque threshold, controlling the engine to stop and controlling the power battery to power the driving motor to support the wheel torque by the power battery.

14. The method according to claim 11, wherein the third wheel torque threshold positively correlates with the SOC of the power battery.

15. The method according to claim 1, wherein when the hybrid vehicle operates in the series mode, in response to that the SOC of the power battery is in a first interval, the engine is controlled to operate on a first economic line; and in response to that the SOC of the power battery is in a second interval, the engine is controlled to operate on a second economic line, wherein an upper limit of the second interval is less than or equal to a lower limit of the first interval; the first economic line is an optimum economic line of the series mode; and at a same rotation speed, a second output torque of the engine operated on the second economic line is greater than or equal to a first output torque of the engine operated on the first economic line.

16. The method according to claim 1, wherein when the hybrid vehicle operates in the parallel mode, in response to that the SOC of the power battery is in a third interval, the engine is controlled to operate on a third economic line;

in response to that the SOC of the power battery is in a fourth interval, the engine is controlled to operate on a fourth economic line; and in response to that the SOC of the power battery is in a fifth interval, the engine is controlled to operate on a fifth economic line, wherein an upper limit of the fifth interval is less than or equal to a lower limit of the fourth interval, and an upper limit of the fourth interval is less than or equal to a lower limit of the third interval; the third economic line is an optimum economic line in the parallel mode, the fifth economic line coincides with an external characteristic line of the engine, and the fourth economic line is located between the fifth economic line and the third economic line.

17. The method according to claim 1, wherein when the hybrid vehicle operates in the EV mode, in response to that the SOC of the power battery is less than a third value, the hybrid vehicle is controlled, according to the SOC of the power battery, the vehicle speed, and the wheel torque, to operate in the series mode or the parallel mode, and the engine is controlled to operate in the economic zone.

18. A non-transitory computer-readable storage medium, storing a control program for a hybrid vehicle, wherein when the control program is executed by a processor, causes the processor to perform operations, wherein the hybrid vehicle comprises an engine, a driving motor, an electric generator, and a power battery, the engine is configured to output power to a wheel end, the driving motor is configured to output power to the wheel end, the electric generator is connected to the engine and driven by the engine to generate electricity, the power battery is configured to supply electricity to the driving motor and is charged with an alternating current outputted by the electric generator or the driving motor, and a capacity of the power battery is greater than or equal to a first capacity, and the operations comprise:

acquiring a traveling parameter of the hybrid vehicle, wherein the traveling parameter comprises a wheel torque, a state of charge (SOC) of the power battery, and a vehicle speed of the hybrid vehicle;

controlling the engine, the driving motor, and the electric generator according to the wheel torque, the SOC of the power battery, and the vehicle speed of the hybrid vehicle, to enable the engine to operate in an economic zone by controlling charging and discharging of the power battery;

comparing equivalent fuel consumptions of a series mode, a parallel mode, and an EV mode of the hybrid vehicle, and determining a minimum equivalent fuel consumption among the equivalent fuel consumptions, and selecting one of the series mode, the parallel mode, or the EV mode having the minimum equivalent fuel consumption as a current operation mode of the hybrid vehicle.

19. A vehicle controller for a hybrid vehicle, comprising: a memory, a processor, and a control program stored in the memory and executable on the processor, wherein when the control program is executed by the processor, causes the processor to perform operations, wherein the hybrid vehicle comprises an engine, a driving motor, an electric generator, and a power battery, the engine is configured to output power to a wheel end, the driving motor is configured to output power to the wheel end, the electric generator is connected to the engine and driven by the engine to generate electricity, the power battery is configured to supply electricity to the driving motor and is charged with an alternating current outputted by the electric generator or the driving motor, and a capacity of the power battery is greater than or equal to a first capacity, and the operations comprise:

acquiring a traveling parameter of the hybrid vehicle, wherein the traveling parameter comprises a wheel torque, a state of charge (SOC) of the power battery, and a vehicle speed of the hybrid vehicle;

controlling the engine, the driving motor, and the electric generator according to the wheel torque, the SOC of the power battery, and the vehicle speed of the hybrid vehicle, to enable the engine to operate in an economic zone by controlling charging and discharging of the power battery;

comparing equivalent fuel consumptions of a series mode, a parallel mode, and an EV mode of the hybrid vehicle, and determining a minimum equivalent fuel consumption among the equivalent fuel consumptions; and selecting one of the series mode, the parallel mode, or the EV mode having the minimum equivalent fuel consumption as a current operation mode of the hybrid vehicle.

\* \* \* \* \*